(12) United States Patent
Giurgiutiu et al.

(10) Patent No.: US 11,958,255 B2
(45) Date of Patent: Apr. 16, 2024

(54) IN-SITU FIBER-OPTIC TEMPERATURE FIELD MEASUREMENT DURING THERMOPLASTIC COMPOSITE WELDING AND OTHER APPLICATIONS

(71) Applicant: UNIVERSITY OF SOUTH CAROLINA, Columbia, SC (US)

(72) Inventors: Victor Giurgiutiu, Columbia, SC (US); Michael Van Tooren, Elgin, SC (US); Bin Lin, Irmo, SC (US); Lingyu Yu, Columbia, SC (US); Mohammad Faisal Haider, West Columbia, SC (US)

(73) Assignee: University of South Carolina, Columbia, SC (US)

(*) Notice: Subject to any disclaimer, the term of this patent is extended or adjusted under 35 U.S.C. 154(b) by 570 days.

(21) Appl. No.: 16/367,541

(22) Filed: Mar. 28, 2019

(65) Prior Publication Data
US 2020/0039153 A1    Feb. 6, 2020

Related U.S. Application Data

(60) Provisional application No. 62/712,274, filed on Jul. 31, 2018.

(51) Int. Cl.
*B29C 65/00* (2006.01)
*B29C 65/36* (2006.01)
(Continued)

(52) U.S. Cl.
CPC .... *B29C 66/91221* (2013.01); *B29C 65/3636* (2013.01); *B29C 65/3696* (2013.01);
(Continued)

(58) Field of Classification Search
CPC ............ B29C 65/3636; B29C 65/3696; B29C 66/91221; B29C 66/7212;
(Continued)

(56) References Cited

U.S. PATENT DOCUMENTS 6,659,957 B1    12/2003    Vardi et al.
6,996,480 B2     2/2006    Giurgiutiu et al.
(Continued)

OTHER PUBLICATIONS

Coppola, et al. "Analysis of feasibility on the use of fiber Bragg grating sensors as ultrasound detectors" *Proc. SPIE* 432S (2001) pp. 224-232.
(Continued)

*Primary Examiner* — George R Koch
(74) *Attorney, Agent, or Firm* — DORITY & MANNING, P.A.

(57) ABSTRACT

An in-situ fiber-optic temperature field measurement is disclosed that can allow process monitoring and diagnosis for thermoplastic composite welding and other applications. A distributed fiber-optic sensor can be permanently embedded in a thermoplastic welded structure when it is welded and left there to perform lifelong monitoring and inspection. The fiber optic sensor can include a dissolvable coating, or a coating matched to the composite material to be welded. Other applications include in-situ fiber-optic temperature field measurement on thermoset composite curing (autoclave), for thermoplastic and thermoset composites during compression molding, and for fiber-optic field measurements on freeze/thaw of large items of public health interest, such as stored or transported foodstuffs.

6 Claims, 32 Drawing Sheets

(51) Int. Cl.
 B29K 307/04 (2006.01)
 G01K 11/32 (2021.01)
(52) U.S. Cl.
 CPC .... *B29C 66/7212* (2013.01); *B29C 66/73921* (2013.01); *B29C 66/91211* (2013.01); *G01K 11/32* (2013.01); *B29K 2307/04* (2013.01)
(58) Field of Classification Search
 CPC ........ B29C 66/73921; B29C 66/91211; G01K 11/32; B29K 2307/04
 See application file for complete search history.

(56) References Cited

U.S. PATENT DOCUMENTS

| | | | |
|---|---|---|---|
| 7,174,255 | B2 | 2/2007 | Giurgiutiu et al. |
| 7,881,881 | B2 | 2/2011 | Giurgiutiu et al. |
| 9,158,054 | B2 | 10/2015 | Giurgiutiu et al. |
| 2005/0114045 | A1 | 5/2005 | Giurgiutiu et al. |
| 2005/0228597 | A1 | 10/2005 | Giurgiutiu et al. |
| 2007/0200057 | A1* | 8/2007 | Ogisu ................. G01M 11/083 250/227.14 |
| 2009/0048789 | A1 | 2/2009 | Yu et al. |
| 2010/0042338 | A1 | 2/2010 | Giurgiutiu et al. |
| 2012/0280414 | A1 | 11/2012 | Giurgiutiu et al. |
| 2013/0034324 | A1* | 2/2013 | Laing ..................... B29C 65/48 374/161 |
| 2013/0129275 | A1 | 5/2013 | Giurgiutiu et al. |
| 2014/0199040 | A1* | 7/2014 | Sohma .................. C03C 25/106 385/128 |
| 2017/0113422 | A1* | 4/2017 | Maass ................... B29C 70/386 |
| 2018/0335406 | A1 | 11/2018 | Giurgiutiu et al. |
| 2019/0049271 | A1* | 2/2019 | Miyashita ........... F28D 15/0275 |
| 2019/0193338 | A1* | 6/2019 | Penumadu ........ B29C 66/73921 |
| 2021/0206126 | A1* | 7/2021 | Shimizu ................. B29C 33/02 |

OTHER PUBLICATIONS

Luo, et al. "Numerical analysis and optimization of optical spectral characteristics of fiber Bragg gratings modulated by a transverse acoustic wave" *Appl. Optic.* 46 (2007) pp. 6959-6965.

Minardo, et al. "Response of fiber Bragg gratings to longitudinal ultrasonic waves" *IEEE Trans. Ultras. Ferroelec.* 52 (2005) pp. 304-312.

Mizukami, et al. "Detection of Delamination in Thermoplastic CFRP Welded Zones Using Induction Heating Assisted Eddy Current Testing" *NDT&E Int'l* 74 (2015) pp. 106-111.

Nino, et al. "Thermal NDI of Resistance Welded Composite Structures" *Comp. Part B* 40(3) (2009) pp. 237-248.

Offringa, A. "New Thermoplastic Composite Design Concepts and Automated Manufacture" *JEC Comp. News* 58 (2011) pp. 1-9.

Red, C. "Thermoplastics in Aerospace Composites, 2014-2023" *High Perf. Comp.* (2014) pp. 1-9.

\* cited by examiner

| Fiber types | Core diameter (µm) | Cladding diameter (µm) | Coating diameter (µm) |
|---|---|---|---|
| SM polyimide radiation resistant (Thick) | 9 | 125 | 155 |
| SM1500 (Thin) | 5.3 | 80 | 102 |

FIGURE 16

FIGURE 19A  FIGURE 19B
Pristine    Thin fiber    Thick fiber
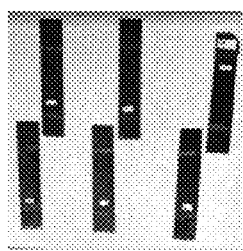 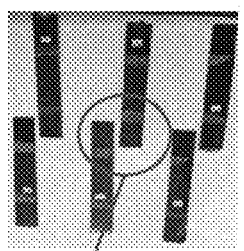 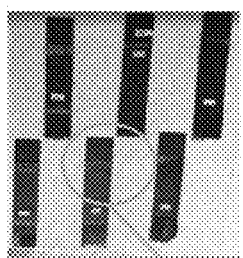
FIGURE 19C
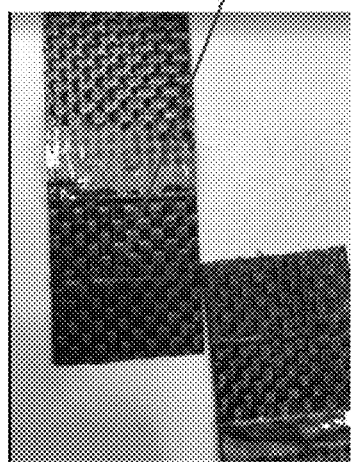  Enlarged views  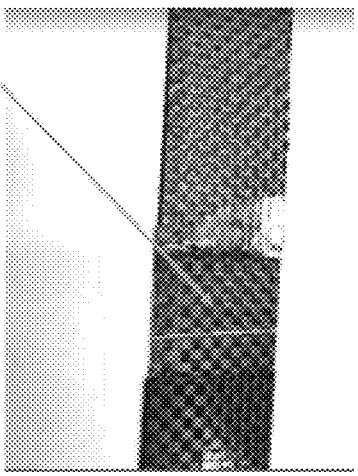
FIGURE 19D            FIGURE 19E Unpolished Polished PPS coated optical fiber No PPS coated optical fiber
(Polyimide only)

IN-SITU FIBER-OPTIC TEMPERATURE FIELD MEASUREMENT DURING THERMOPLASTIC COMPOSITE WELDING AND OTHER APPLICATIONS

PRIORITY CLAIM

This application claims the benefit of previously filed U.S. Provisional Patent Application, entitled "In-Situ Fiber-Optic Temperature Field Measurement During Thermoplastic Composite Welding and Other Applications," assigned U.S. Ser. No. 62/712,274, filed Jul. 31, 2018, and which is fully incorporated herein by reference for all purposes.

BACKGROUND OF THE PRESENTLY DISCLOSED SUBJECT MATTER

The presently disclosed subject matter generally relates to temperature measurement, and more particularly, to in-situ fiber-optic temperature field measurement. Further, for certain process monitoring and diagnosis for thermoplastic composite welding and other applications, a distributed fiber-optic sensor can be permanently embedded in the thermoplastic welded structure when it is welded and left there to perform lifelong monitoring and inspection.

Thermoplastic composites are of growing interest in the aerospace sector because of their inherent properties. Their high toughness results in low-weight designs. The physical process only involves melting without a curing cycle, which results in fast and robust processing. The usage of thermoplastic composites in aerospace primary parts is growing at an accelerated rate.

One advantage of thermoplastic composites over thermoset (e.g., epoxy) composites is their weldability. Polymer composites can be joined by welding, adhesive bonding, and mechanical fastening. Welding is appropriate for thermoplastic composites whereas adhesive bonding is mostly used for thermoset composites. The choice of process is affected by the material to be joined, the joint configuration, the strength of joint required, the level of seal required, the process cost and speed, and the production quantity.

Welding processes rely on heat at the joint to melt the adjacent polymer, with a weld forming on cooling. There are a number of different methods of welding thermoplastics, which can be split into three general classifications:
  Techniques employing an external heat source (e.g., hot plate welding, hot bar welding, impulse welding, hot gas welding, extrusion welding, flash-free welding);
  Techniques where heat is generated by mechanical movement (e.g., vibration welding aka linear friction welding, spin welding, orbital welding, ultrasonic welding, friction stir welding); and
  Techniques which directly employ electromagnetism (e.g., resistive implant welding, induction welding, high-frequency welding aka radio frequency welding or dielectric welding, laser welding, infrared welding, microwave welding).

For welding processes, quality control heavily relies on the process control. Proper welding relies on proper temperature and pressure for certain time. The quality of the welding relies completely on the repeatability of the process. Verifying the process requires therefore measurement of the temperature at the weld surface during process. If any design changes are required in the part which affect the joint geometry, requalification using temperature information needs to be performed. Fiber optic sensors are one type of sensor used to monitor strain or temperature.

Structural health monitoring (SHM) is a method of determining the health of a structure from the readings of an array of sensors that are embedded into the structure or permanently attached to and monitor over time. SHM approaches aim at performing a diagnosis of the structural safety and health, to be followed by a prognosis of the remaining life.

In-situ measurement of temperature distribution during welding is challenging and very difficult to attain. Infrared (IR) techniques can be used to assess the temperature values, but such values would pertain only to the material surface and not to the interior of the material where the welding process takes place. Such is particularly important in induction welding processes where the temperature inside the weld is considerably different from the surface temperature; in fact, in such case, the surface of the material is deliberately kept at a lower temperature so that its material properties are not significantly affected by the induction welding process.

One typical application is the induction welding of carbon fiber reinforced polymers (CFRP) composites where the composite matrix is a thermoplastic polymer. In such case, induction heating is possible due to the conductivity properties of the carbon-fiber. For example, if two plates are welded to create a lap joint, then the plates themselves must be kept at sub-melting temperatures to avoid affecting their mechanical strength while the junction between the plates is being induction heated above the melting temperature to create the weld between the two plates. Simultaneous measurement of the temperature field inside the welding region, as well as in the two plates forming the weld, is of essential importance for the success of the welding process.

In addition, spatial temperature distribution readings are very important because spot reading of the temperature may not fully represent the temperature gradients and spatial distribution during the welding process. Thus, sensors that can distributively measure the temperature of the material that is being melted during the welding process, as well as the material surrounding the welding area, in order to evaluate the heat affected zone are of great interest and importance for developing a successful thermoplastic welding process.

If the thermoplastic welding process is incorrectly conducted, defects may occur between welded CFRP parts for several reasons:
  release of stored elastic energy in the deformed carbon fiber bundles when the viscosity of the matrix decreases;
  expansion of entrapped air;
  thermal stresses;
  excessive squeeze flow of resin due to excessive pressure; and
  insufficient squeeze of air in bondline due to insufficient pressure.

Such defects present important problems and need to be detected and repaired. However, the nondestructive techniques for quality assurance (QA) of thermoplastic composite welds are, to date, very limited. Such lack of nondestructive QA methods obligate the designers to take large margins of safety and consider worst-case design scenarios in which a portion of the weld is assumed to be weak or disbonded without the possibility for inspecting it from the outside (e.g., the welding T joint between thermoplastic skin and the thermoplastic stringer). Thus, great importance is placed on the correct scheduling of the welding process itself with in-situ temperature distribution measurements playing a crucial role.

In the past, thermocouples have been tried during induction welding of thermoplastic materials, but their presence creates a mechanical discontinuity that would adversely affect the mechanical strength of the weld. In addition, thermocouples offer only pointwise temperature measurements, whereas knowledge of the spatial distribution of the temperature is actually needed. Under rapidly varying spatial temperature distribution with considerable gradients, pointwise measurements may not be amiable to interpolation and may yield incorrect temperature maps. Due to such limitations of the thermocouple techniques, new and innovative means of in-situ temperature distribution measurement during thermoplastic composite welding are needed.

One example of previously known sensor technology is represented by U.S. Pat. No. 9,158,054 B2, entitled "Acousto-Ultrasonic Sensor," and commonly owned with the presently disclosed subject matter. The complete disclosure of such prior issued patent is fully incorporated herewith and for all purposes.

SUMMARY OF THE PRESENTLY DISCLOSED SUBJECT MATTER

In general, it is a present object to provide improved temperature measurement arrangements and associated methodology. It is a more particular object, in some instances, to provide an in-situ approach that can perform on-demand process monitoring and diagnosis for thermoplastic welding and other application is developed in the presently disclosed subject matter. Such monitoring and diagnosis approach described herein is based on the following fundamental objectives:

- ability to assess the thermoplastic welding process and other applications
- ability to detect, locate, and assess the defects during the welding process and other application
- ability to perform in-situ embedded health monitoring and diagnosis after the welding A distributed fiber optic sensor per presently disclosed subject matter can be permanently embedded in the thermoplastic welded structure when it is welded and left there to perform lifelong monitoring and inspection. Other applications include, but are not limited to, in-situ temperature filed monitoring on thermoset curing, compression molding, or similar.

Some presently disclosed embodiments relate to disclosed apparatus and related, while others relate to presently disclosed corresponding and/or associated methodology. In some such exemplary apparatus embodiments, a sensor preferably comprises a fiber optic sensor comprising an optical fiber having an elongated body portion for being a distributed sensor received in association with a specimen to be sensed, such fiber optic sensor further having a connection for being connected to an associated optical data acquisition system, whereby monitoring and diagnosis associated with such specimen may be conducted at plural locations of such associated specimen.

In some such exemplary sensor embodiments, at least one of temperature and strain readings may be taken from plural locations of the associated specimen. In others, the associated specimen may comprise a carbon fiber reinforced polymer (CFRP) composite where the composite matrix is a thermoplastic polymer, and the specimen is to be treated by induction welding. In yet others, the associated specimen may comprise a thermoplastic composite welded structure, and such sensor may be adapted to be embedded in such structure during welding thereof, for manufacturing in-situ fiber-optic temperature field measurement thereof. For still other alternatives thereof, the associated specimen may comprise a thermoplastic composite welded structure, and such sensor may be adapted to be embedded in such structure during welding thereof, for at least one of examining residue strain after welding, monitoring temperature distribution during welding operations, and monitoring strain change during welding operations.

Per some presently disclosed exemplary embodiments, several of such alternative sensor arrangements may be used in various presently disclosed exemplary methodologies. One such exemplary methodology may preferably include associating such sensor with a specimen to be sensed, and connecting such fiber optic sensor with an optical data acquisition system, for monitoring of such specimen.

In another exemplary methodology, such method may preferably include determining in-situ fiber-optic temperature field measurements for monitoring temperature distribution during at least one of: thermoplastic composite welding, thermoset composite curing, composite compression molding, and freezing and thawing of large items of public health interest.

Various alternatives of the foregoing sensor arrangements may also include exemplary embodiments where the associated specimen may comprise two plates to be welded to create a lap joint, and such elongated distributed sensor may be wrapped around each respective plate and through a welding region between such two plates so that simultaneous measurement of the temperature field inside the welding region and in the two plates is achieved during the welding process.

In yet other alternatives, such distributed sensor may comprise a relatively high temperature coating and a relatively small diameter fiber, so that such sensor can withstand temperature and pressure during welding of an associated structure to be sensed.

For still others, such sensor may be adapted to be permanently embedded in the associated structure for monitoring and inspection of such structure over its lifetime.

For several of the foregoing exemplary methodologies, various alternatives may be practiced in some instances. For one such exemplary alternative, such method may comprise monitoring and controlling temperatures during a welding process through using induction heating based on conductivity properties of the carbon fiber specimen; controlling temperatures of the plates themselves to be kept at sub-melting temperatures to avoid affecting mechanical strength of the plates; and while induction heating the junction between the plates above the melting temperature to create the weld between the two plates. In some variations of the foregoing, such method may further include placing a heat-sink under such plates to cool the bottom surface thereof, and providing active air cooling to cool the top surface of such plates.

In yet other variations, presently disclosed methodology may also include monitoring temperatures at selected portions of such structure during welding thereof using such sensor and controlling such temperatures for welding process quality control.

For still other variations, an exemplary method may include obtaining spatial temperature distribution readings at selected portions of such structure during welding thereof, using such sensor to distributively measure temperature of the material being melted during the welding process and that of the material surrounding the welding area in order to evaluate a heat affected zone, and controlling such temperatures for welding process quality control.

In other present alternatives, a presently disclosed exemplary method may include periodically diagnosing readings from such sensor permanently embedded in the associated structure for conducting structural health monitoring and inspection of such structure over its lifetime.

In other alternative presently disclosed methodologies, such specimen may comprise a thermoplastic composite welded structure, and such sensor may be adapted to be embedded in such structure during welding thereof, for manufacturing in-situ fiber-optic temperature field measurement thereof.

For still other presently disclosed alternatives, an exemplary methodology may further include determining temperature data from such specimen with such sensor and such optical data acquisition system.

Additional objects and advantages of the presently disclosed subject matter are set forth in, or will be apparent to, those of ordinary skill in the art from the detailed description herein. Also, it should be further appreciated that modifications and variations to the specifically illustrated, referred and discussed features, elements, and steps hereof, may be practiced in various embodiments, uses, and practices of the presently disclosed subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the presently disclosed subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the presently disclosed subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification, and will appreciate that the presently disclosed subject matter applies equally to corresponding methodologies as associated with practice of any of the present exemplary devices, and vice versa.

BRIEF DESCRIPTION OF THE FIGURES

A full and enabling disclosure of the presently disclosed subject matter, including the best mode thereof, to one of ordinary skill in the art, is set forth more particularly including the specification, and including reference to the accompanying figures in which:

FIG. 16 is a chart representation of an exemplary embodiment of presently disclosed subject matter;

FIGS. 19A through 19E illustrate respective representations of exemplary embodiments of presently disclosed subject matter, sampled for testing;

Figure 1:
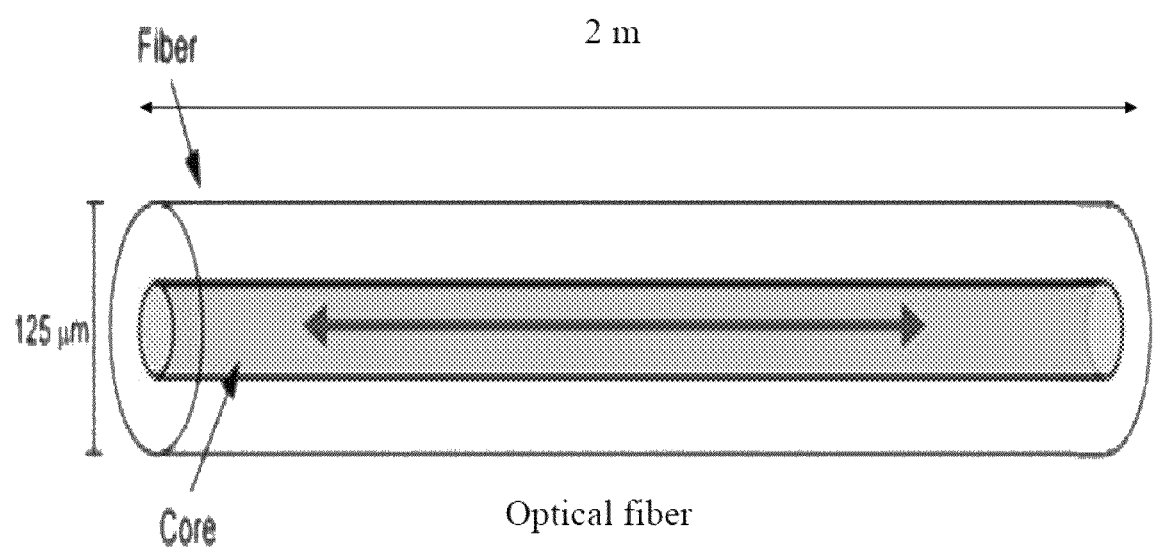
FIG. 1 is a schematic view representation of optical fiber for an exemplary embodiment of presently disclosed subject matter.

Repeat use of reference characters in the present specification and drawings is intended to represent the same or analogous features or elements or steps of the presently disclosed subject matter.

DETAILED DESCRIPTION OF THE PRESENTLY DISCLOSED SUBJECT MATTER

Reference will now be made in detail to various embodiments of the presently disclosed subject matter, one or more examples of which are set forth below. Each embodiment is provided by way of explanation of the subject matter, not limitation thereof. In fact, it will be apparent to those skilled in the art that various modifications and variations may be made in the presently disclosed subject matter without departing from the scope or spirit of the subject matter. For instance, features illustrated or described as part of one embodiment, may be used in another embodiment to yield a still further embodiment, and corresponding and/or associated methodologies may be practiced relative to apparatus disclosed and/or suggested herewith, all of which comprise various embodiments of the presently disclosed subject matter.

An in-situ fiber-optic temperature field measurement that can perform process monitoring and diagnosis for thermoplastic composite welding and other applications is disclosed in the presently-disclosed subject matter. One aspect of such presently disclosed subject matter in some embodiments thereof is a distributed fiber-optic sensor that can be permanently embedded in the thermoplastic welded structure when it is welded and left there to perform lifelong monitoring and inspection. Other applications include in-situ fiber-optic temperature field measurement on thermoset composite curing (autoclave), for thermoplastic and thermoset composites during compression molding, and for fiber-optic field measurements on freeze/thaw of large items of public health interest, such as stored or transported foodstuffs.

One major potential industrial application of the presently disclosed subject matter is in aerospace engineering. Using the in-situ distributed fiber optic sensor, a solution for monitoring thermoplastic welding is available which may be advantageously adopted by many industrial users. Utilizing various properties of the presently disclosed distributed fiber optic sensor, a variety of methods can be integrated into such a sensing system or arrangement as disclosed herewith to detect such as temperature and/or strain, from an initial manufacturing process to the entire operational life of the structure.

An in-situ approach that can perform on-demand process monitoring and diagnosis for thermoplastic welding and other application is therefore advantageously provided in the presently disclosed subject matter. The monitoring and diagnosis approach described herein in certain instances is based on the following objectives:

ability to assess the thermoplastic welding process and other applications;

ability to detect, locate, and assess the defects during the welding process and other application; and ability to perform in-situ embedded health monitoring and diagnosis after the welding.

One aspect of certain embodiments of the presently disclosed subject matter is a distributed fiber optic sensor that can be permanently embedded in a thermoplastic welded structure when it is welded, and then left there to perform lifelong monitoring and inspection. Other potential applications include but are not limited to in-situ temperature filed monitoring on thermoset curing, compression molding, and similar.

When a sensor is embedded during thermoplastic welding in accordance with the presently disclosed subject matter, the sensor that is being embedded should be able to: (1) sustain the welding temperature; (2) sustain the pressure; (3) sustain the residue contraction caused by the curing process; and (4) function without degradation after the curing. The distributed fiber optic sensor is made of high temperature coating with small diameter fiber.

In some instances for presently disclosed subject matter, it has been preferred to provide sensors with dissolvable coatings for in-situ induction welding monitoring of thermoplastic composites.

In general, regarding presently disclosed subject matter, thermoplastic composites offer several mechanical advantages over thermoset composites, for example, especially regarding damage tolerance. Thermoplastics also offer manufacturing advantages such as the possibility of fusion bonding. For some embodiments of presently disclosed subject matter, induction welding is preferred. As with all welding processes, quality control heavily relies on process control since non-destructive inspection of strength is not possible.

Proper induction welding relies on assuring temperature and pressure to be in a certain window for a certain time. Verifying the process requires, therefore, measurement of the temperature at the weld surface during process qualification, which has previously been very expensive. The presently disclosed subject matter provides the development of a temperature sensor that can be left in the part after manufacture.

One existing prior art approach has involved the use of Carbon Fiber/PPS material in currently flying certified primary, induction welded, structures. Such current approach to welding is qualified by making multiple ship sets equipped with thermocouples, adjusting the process until proper process window is found, scraping test articles, and then welding a series of products keeping process parameters constant.

The presently disclosed in-situ process monitoring and welding uses temperature monitoring techniques with modified sensors for real time, in-situ monitoring of temperatures during welding Optical fiber-High Definition Fiber Optic Sensing (HD-FOS) operations.

FIG. 1 is a schematic view representation of optical fiber for an exemplary embodiment of presently disclosed subject matter. Per presently disclosed subject matter, there is no required electrical signal, and the optical fiber subject matter is chemically inert, lightweight, and embeddable, while sensing strain and temperature. No gratings are required, and the gage length and gage location are configurable through software. Furthermore, ultra high-density data can be obtained with sub millimeter (mm) spatial resolution. In other words, 1000 measurements per meter can be obtained. Subject FIG. 1 includes various dimensions of the exemplary embodiment.

In-situ process monitoring and welding involves per presently disclosed subject matter allowing a sensor to stay in the product after welding. There needs to be no influence on mechanical strength of the welded material, and no source of fatigue damage initiation.

Figure 2:
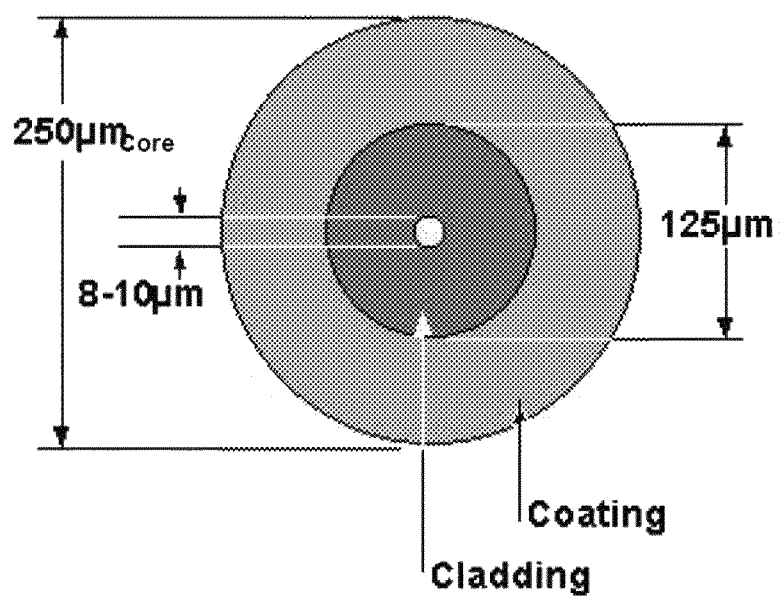
FIG. 2 is a schematic representation of an exemplary PRIOR ART embodiment of a sensor having a core, cladding, and coating.

FIG. 2 is a schematic representation of an exemplary PRIOR ART embodiment of a sensor having core, cladding, and coating features, as illustrated. The core carries light signals, while the cladding keeps the light in the core, and while the coating protects the core and cladding. Exemplary dimensions are indicated as shown in FIG. 2.

As can be seen, the cladding and coating are very large in diameter compared to the carbon fibers in the structural material. Such dimensional relationships result in a source of stress concentrations and fatigue initiation, which is undesirable for an in-situ device and process, as presently disclosed.

Per presently disclosed subject matter, such issues are addressed by replacing the cladding and coating with the same thermoplastic polymer as being used in the material being welded. Such approach of the presently disclosed subject matter then results in the coating and cladding melting during welding and mixing with the base material. In one exemplary embodiment, PPS material was used for the coating and cladding features, which is same material as used in the base material, for example, in the Gulfstream G650 Rudder and elevator.

Generally speaking, existing optical fibers consist of a core (the actual optical fiber), a cladding (consisting of a polymer with a refraction index that will ensure the light to stay within the core), and a coating (a polymer layer to protect the core and cladding during handling). The core+ cladding and coating have a diameter of around 250 micrometers. This is very large compared to a carbon or glass fiber diameter of about 10 micrometers. The presently disclosed subject matter replaces the cladding and coating with a polymer that is equal to the polymer in the composite that one is trying to weld. The cladding and coating will then meld during the welding and will not cause any stress concentration in the material after welding because of its diameter.

The newly developed sensors allow in-situ measuring of temperatures in thermoplastic polymer based composite workpieces during welding, including the temperatures at the weld line. The new sensors can be left in product after welding without negatively influencing the static and/or fatigue strength of the workpieces.

Composites are heterogeneous materials with anisotropic properties that can be tailored for a desired application. They have historically provided outstanding mechanical properties in a lightweight design, led to many technological revolutions, and have recently attracted renewed interest because of its incorporation in the primary structures of major commercial aircraft. Among various composite materials, thermoplastic composites offer several advantages over thermoset composites. Thermoplastic polymer-based composites show a higher toughness, which means they are harder to damage, and if damaged, they will show a higher resistance against the growth of that damage. This feature is important to structure with a high Compression strength After Impact (CAI), one of the current drivers behind composite materials systems.

Thermoplastics also offer the possibility of fusion bonding. This means that parts can be joined by re-melting the parts of the components that need to be joined and solidify these parts under pressure. This allows elimination of fasteners and offers lower weight, reduced part counts and lower fly away cost. The heating required for fusion bonding can originate in contact heat, vibration-based heating etc.

There are many different bonding types in composite structures. Lap joint is one of them. Single lap joint can be made by welding, adhesive bonding or mechanical fastening. Adhesively bonded or welded composite single lap joints possess advantages such as weight reduction over traditional mechanical joining methods and reduce stress concentration. Welding is appropriate for thermoplastic composites, whereas adhesive bonding is mostly used for thermoset composites.

One major challenge during welding of a joint is to keep the temperature above the melting point of the thermoplastic. Low temperature or excessive temperature may deteriorate the mechanical properties of the lap joint. To mitigate the problem, the presently disclosed temperature monitoring methodology uses fiber optic sensor or sensors inserted between two surfaces of a lap joint, to monitor the temperature during the welding process. The presently disclosed subject matter relates in pertinent part to: (1) manufacturing of thermoplastic composite plates, (2) monitoring temperature during welding processes using a distributed fiber optic system, and (3) assessment of mechanical properties based on inclusion of a fiber optic sensor or sensors in the lap joint.

While use of a fiber optic sensor has shown promising results for monitoring the temperature during the welding process, during welding of a lap joint, the fiber optic sensor coating may in some instances melt and adhere to the composite plates inside the lap joint area. In addition, inclusion of fiber optic sensor may in some instances affect the mechanical strength of the lap joint.

Figure 3:
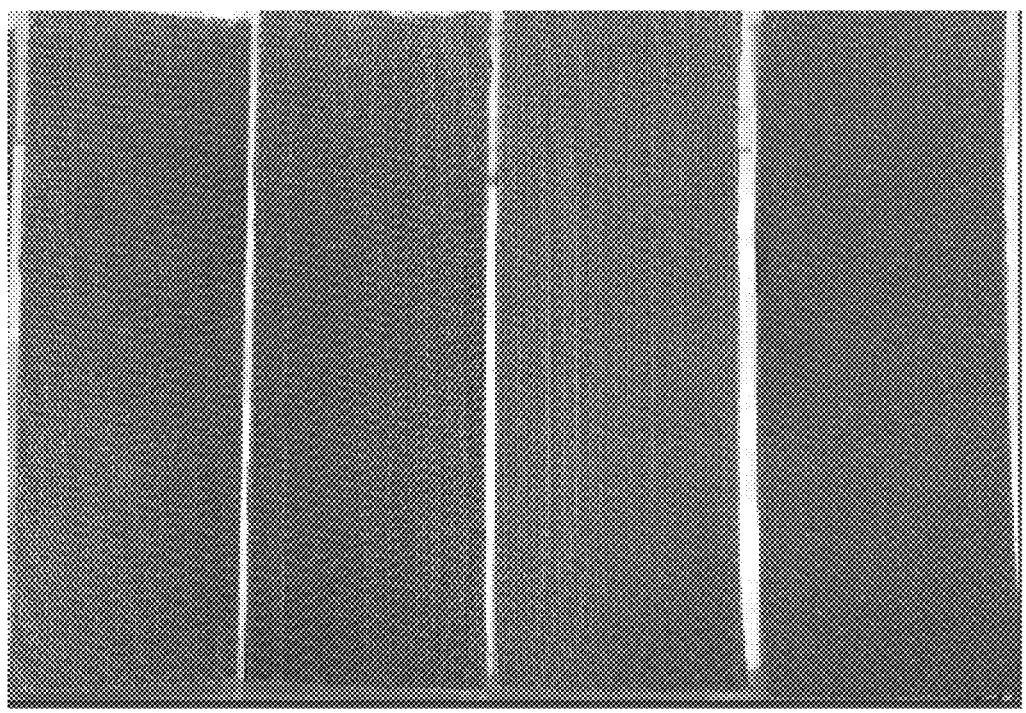
FIG. 3 is a representation of PPS fabric prepreg for use in an exemplary embodiment of presently disclosed subject matter.
Figure 4:
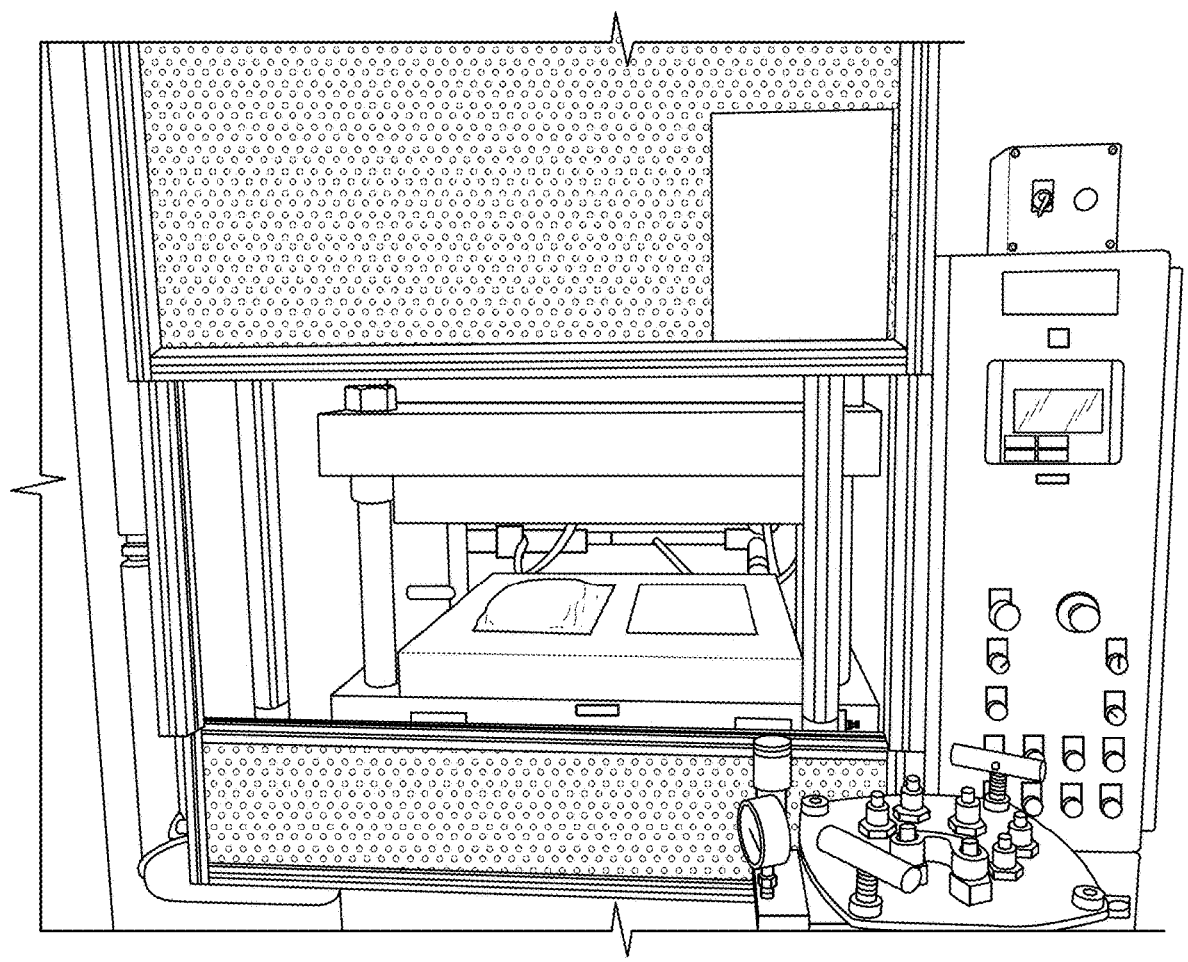
FIG. 4 is a front view representation of an exemplary embodiment of a compression molding machine for use in producing presently disclosed subject matter.

With respect to the task of manufacturing thermoplastic composite plates, one embodiment makes use of Polyphenylene Sulfide (PPS) fabric prepreg from TenCate Cetex to prepare TPC plates for welded specimens. The PPS prepreg was pre-consolidated reinforced laminate with continuous woven carbon fibers, with a melt temperature is 536° F. FIG. 3 is a representation of such PPS fabric prepreg for use in an exemplary embodiment of presently disclosed subject matter. The prepreg was first cut to desired shapes, as shown in FIG. 3. Sample panels with dimensions of 12"×6" were fabricated using a compression molding technique. FIG. 4 is a front view representation of an exemplary embodiment of a compression molding machine for use in producing presently disclosed subject matter. Each sample panel consisted of four layers of the prepreg material.

Figure 5:
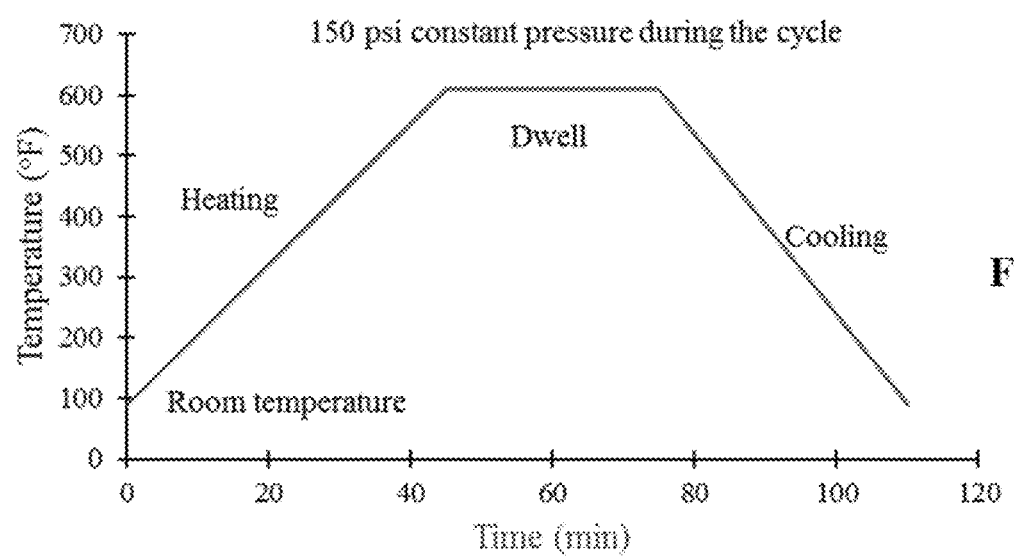
FIG. 5 is a graphical representation of a temperature cycle of PPS prepreg subject matter for use in an exemplary embodiment of presently disclosed subject matter.
Figure 6:
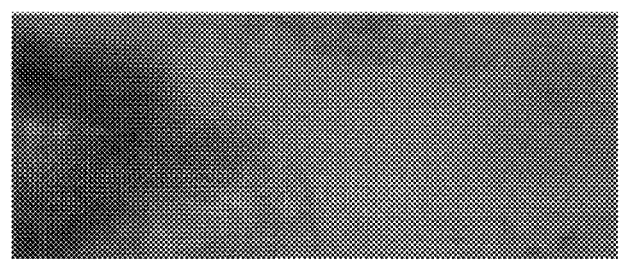
FIG. 6 is a representation of a final composite plate for use in an exemplary embodiment of presently disclosed subject matter.

FIG. 5 is a graphical representation of a temperature cycle of PPS prepreg subject matter for use in an exemplary embodiment of presently disclosed subject. In particular, FIG. 5 shows the standard cure cycle for preparing the laminate. A constant pressure of 150 psi was applied during the cure cycle. Heating was adjusted in the compression molding chamber for raising the laminate temperature to 610° F. within 45 minutes. Then the temperature of laminate was dwelled at 610° F. for 30 minutes. At the end of dwell time, the panel was air cooled from 610° F. to room temperature within 30 minutes. FIG. 6 is a representation of a final composite plate as so obtained for use in an exemplary embodiment of presently disclosed subject matter.

The presently disclosed subject matter provides a technique to monitor the temperature of thermoplastic composite materials welding in real time using distributed fiber optical sensor. Distributed optical fibers can be used to monitor strain and temperature with high space resolution (for example, 5 mm per sensing point) and at a high sampling rate (100 Hz). As further described herein, disclosed exemplary embodiments herewith make use of the distributed fiber optic system ODiSI B from LUNA Inc.

Figure 7A:
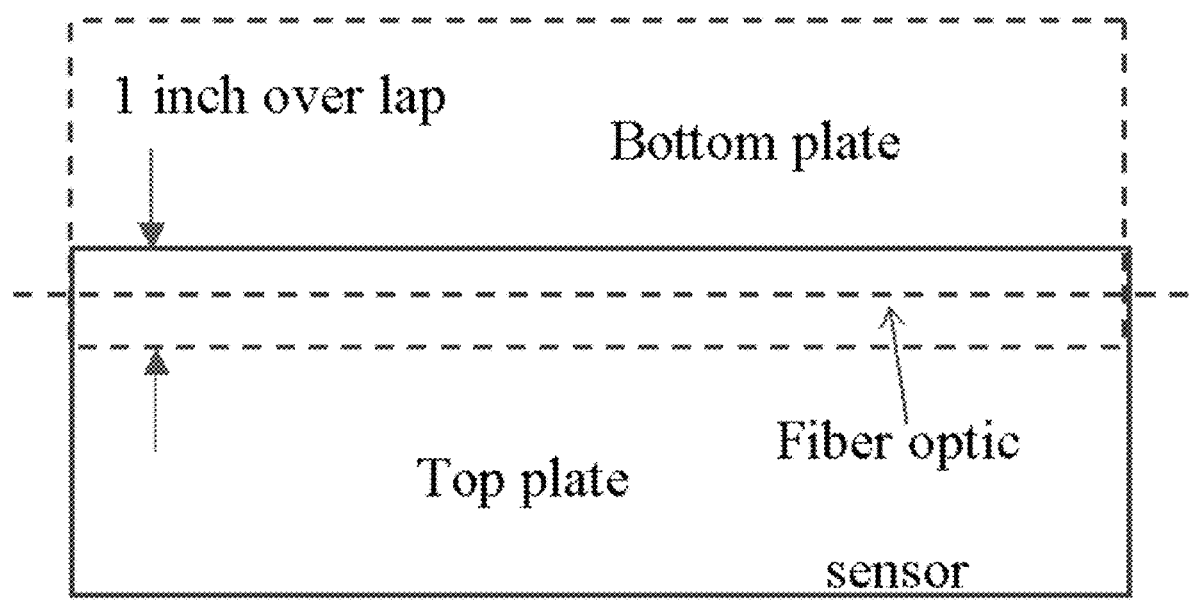
FIG. 7A is a schematic top view representation of an exemplary embodiment of presently disclosed subject matter, illustrating a distributed fiber optic sensor layout on a lap joint specimen.
Figure 7B:
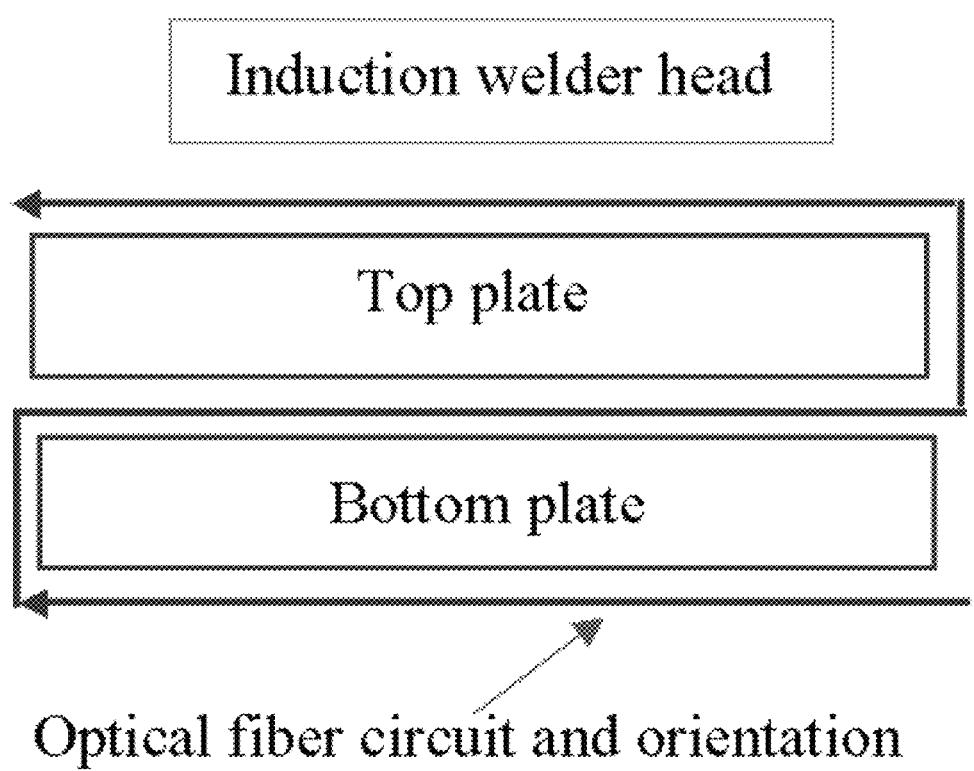
FIG. 7B is a schematic front view representation of an exemplary embodiment of presently disclosed subject matter of present FIG. 7A, illustrating a distributed fiber optic sensor representative layout wrapped around a welding specimen, in accordance with presently disclosed subject matter.

Per the presently disclosed subject matter, a single distributed fiber optic sensor is able to be used to monitor the referenced welding process. In one exemplary embodiment, the 2-meter fiber optic sensor is wrapped around bottom, middle, and top of the plates to be welded, such as represented in present FIGS. 7A and 7B. For example, FIG. 7A illustrates a schematic top view representation of an exemplary embodiment of presently disclosed subject matter, illustrating a distributed fiber optic sensor layout on a lap joint specimen. FIG. 7B illustrates a schematic front view representation of an exemplary embodiment of presently disclosed subject matter of present FIG. 7A, illustrating a distributed fiber optic sensor representative layout wrapped around a welding specimen, in accordance with presently disclosed subject matter.

As seen, a single optical fiber is included in a welding lap joint specimen. The fiber is routed on top of a first workpiece, through the weld line between the two workpieces, and at the bottom of the second workpiece. The two work pieces were heated using induction heating and the temperature was recorded as a function of time. The sensor technology applied in the test uses a non-Bragg grated fiber. The internal defects of the fiber are used as the sensors yielding in this instance about 1 sensor each 2 mm of length. The standard fibers are stripped from their coating and a coating of a polymer similar to the polymer in the workpieces is applied to the fiber instead. Such coating will melt during the welding process and is blending with the polymer in the workpieces. This causes the stress concentration related to the presence of the sensor in the workpieces to be reduced considerably.

Figure 8A:
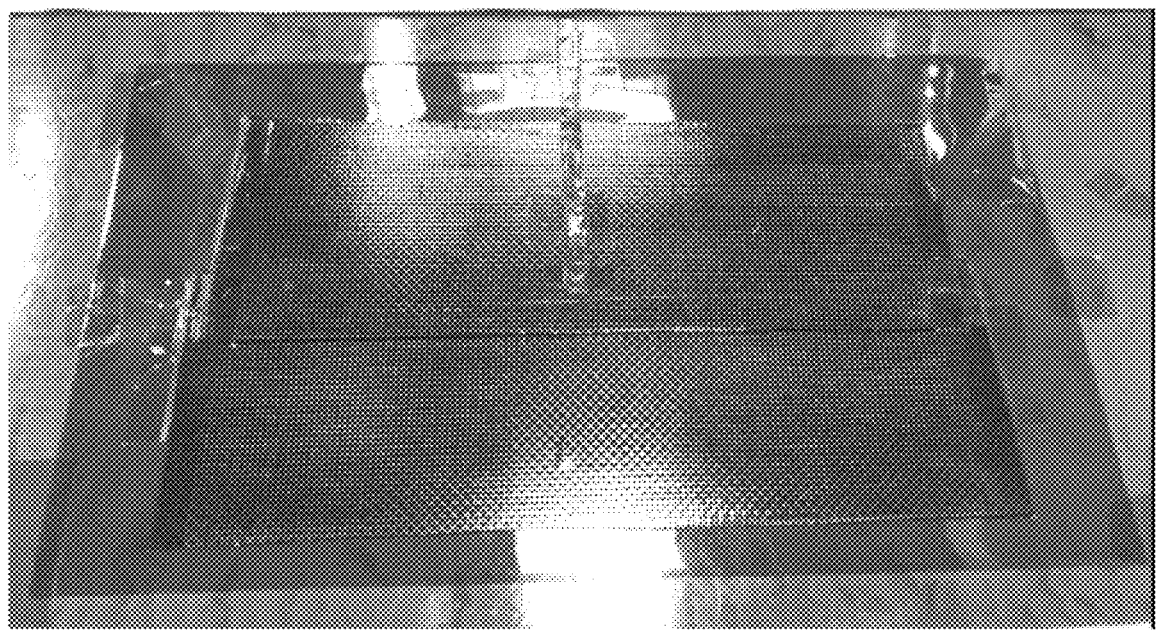
FIG. 8A illustrates a representative test setup in accordance with presently disclosed subject matter of a distributed fiber optic sensor on a thermoplastic PPS (polyphenylene sulfide) specimen.
Figure 8B:
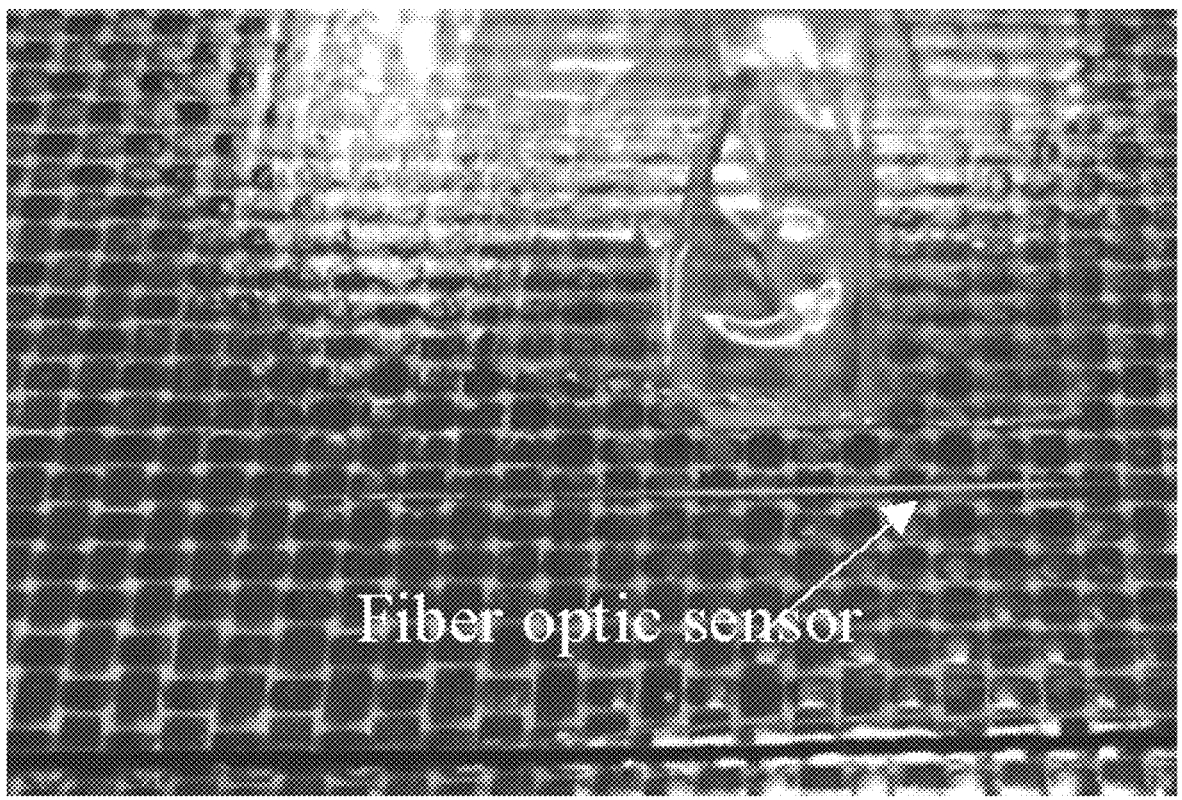
FIG. 8B illustrates an enlarged view of the top plate of the representative test setup of FIG. 8A in accordance with presently disclosed subject matter, to better illustrate a fiber optic sensor on top.

FIG. 8A shows an experimental setup of a fiber optic sensor on a thermoplastic PPS specimen, in accordance with presently disclosed subject matter. More specifically, FIG. 8A illustrates a representative test setup in accordance with presently disclosed subject matter of a distributed fiber optic sensor on a thermoplastic PPS (polyphenylene sulfide) specimen. FIG. 8B illustrates an enlarged view of the top plate of the representative test setup of FIG. 8A in accordance with presently disclosed subject matter. Such FIG. 8B better illustrates a fiber optic sensor on top, per presently disclosed subject matter.

Figure 9:
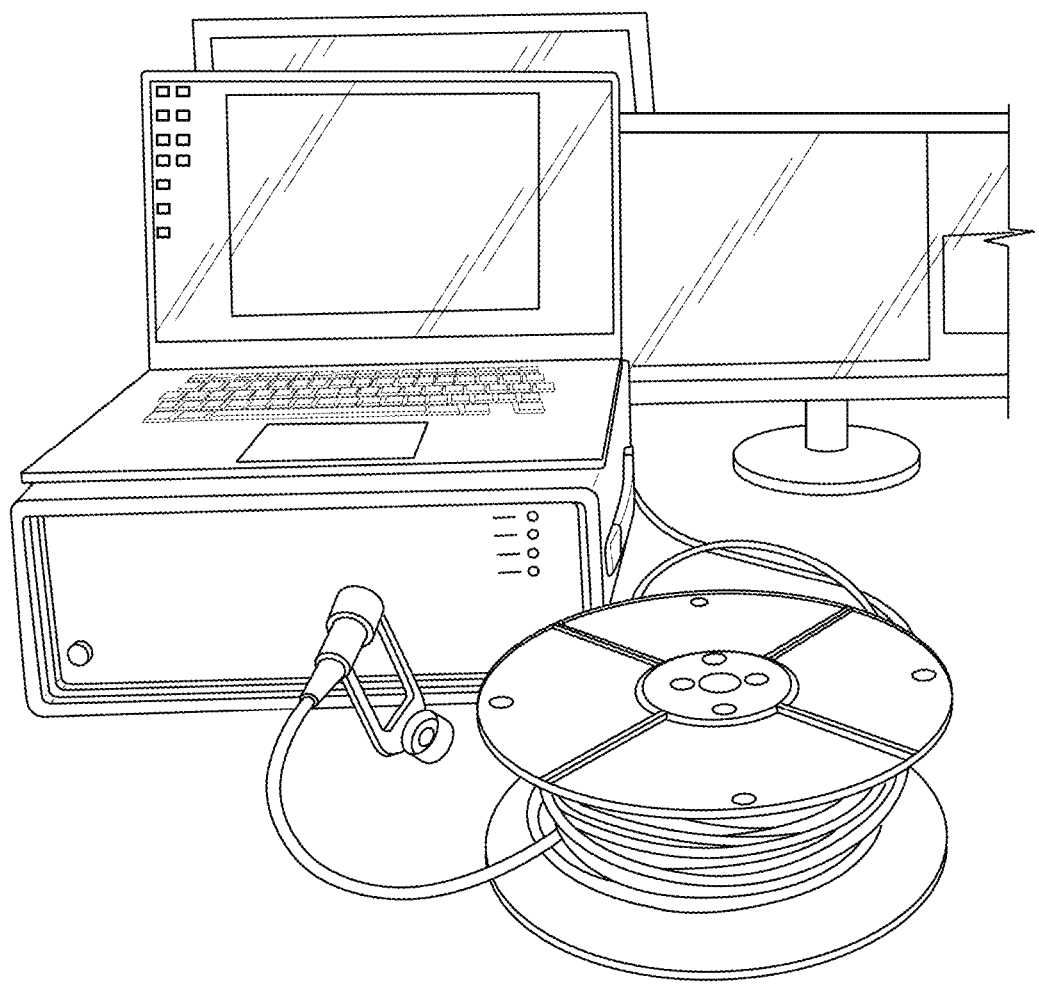
FIG. 9 represents in-situ temperature monitoring arrangements for use in accordance with presently disclosed subject matter during thermoplastic composite welding.
Figure 10A:
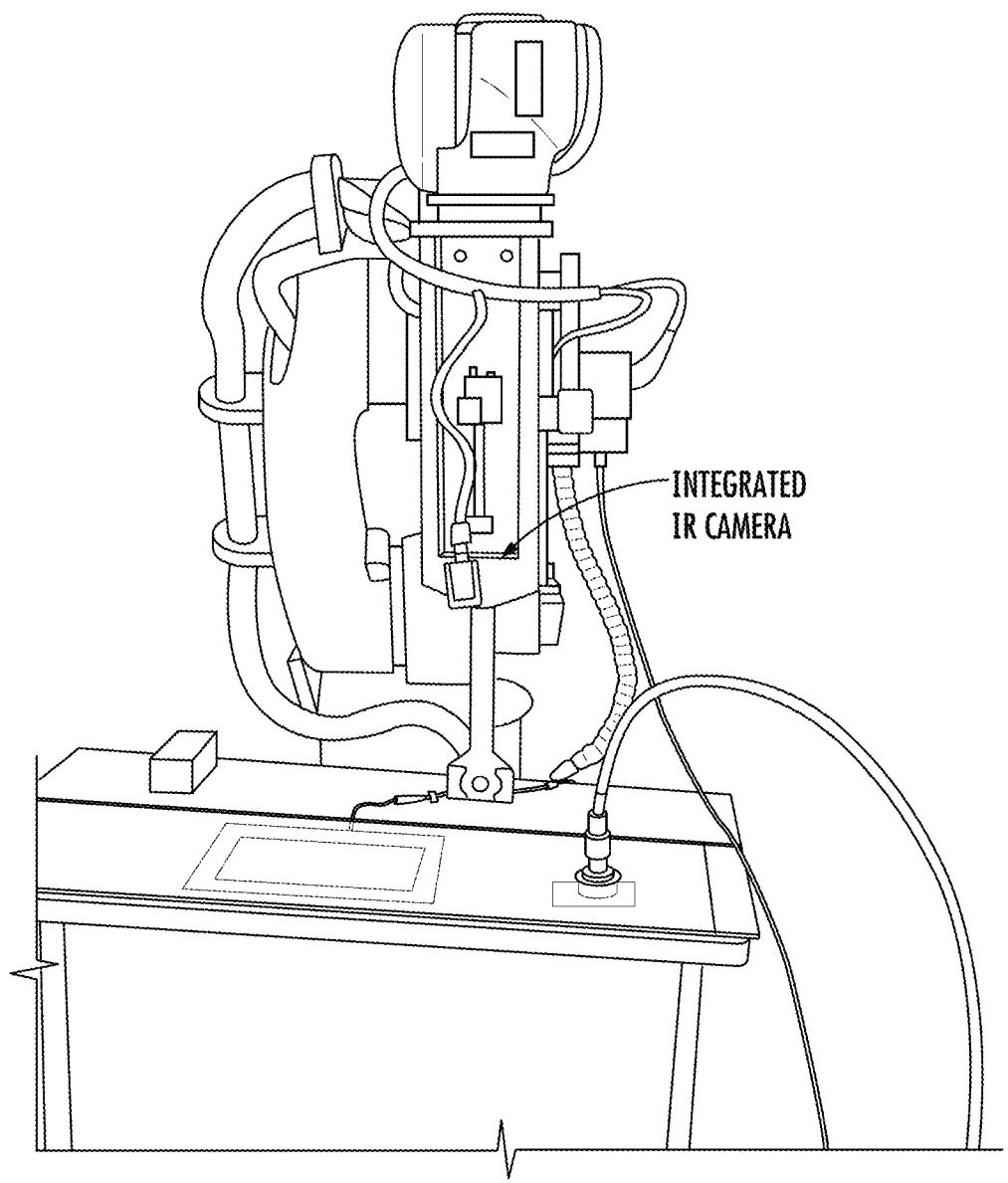
FIGS. 10A, 10B, and 10C represent respective views of in-situ temperature monitoring arrangements for use in accordance with presently disclosed subject matter during welding.
Figure 10B:
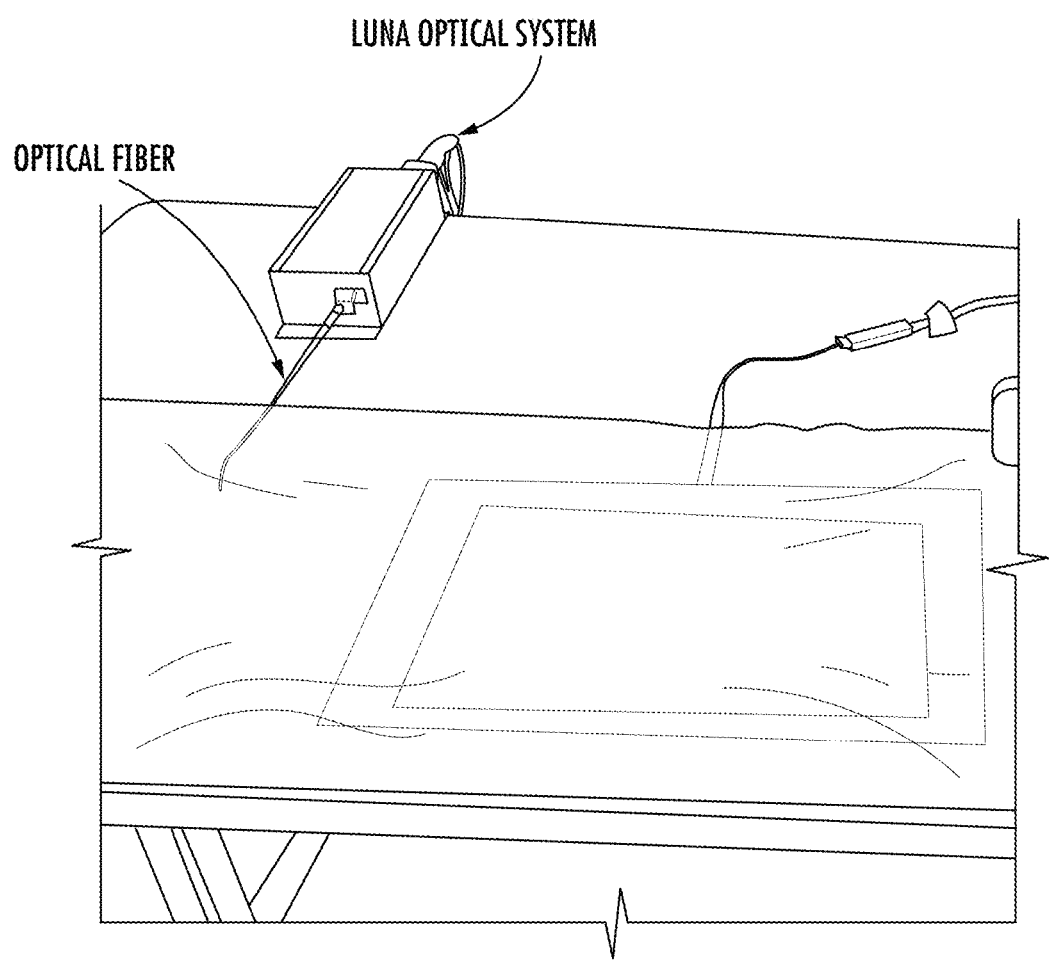
Figure 10C:
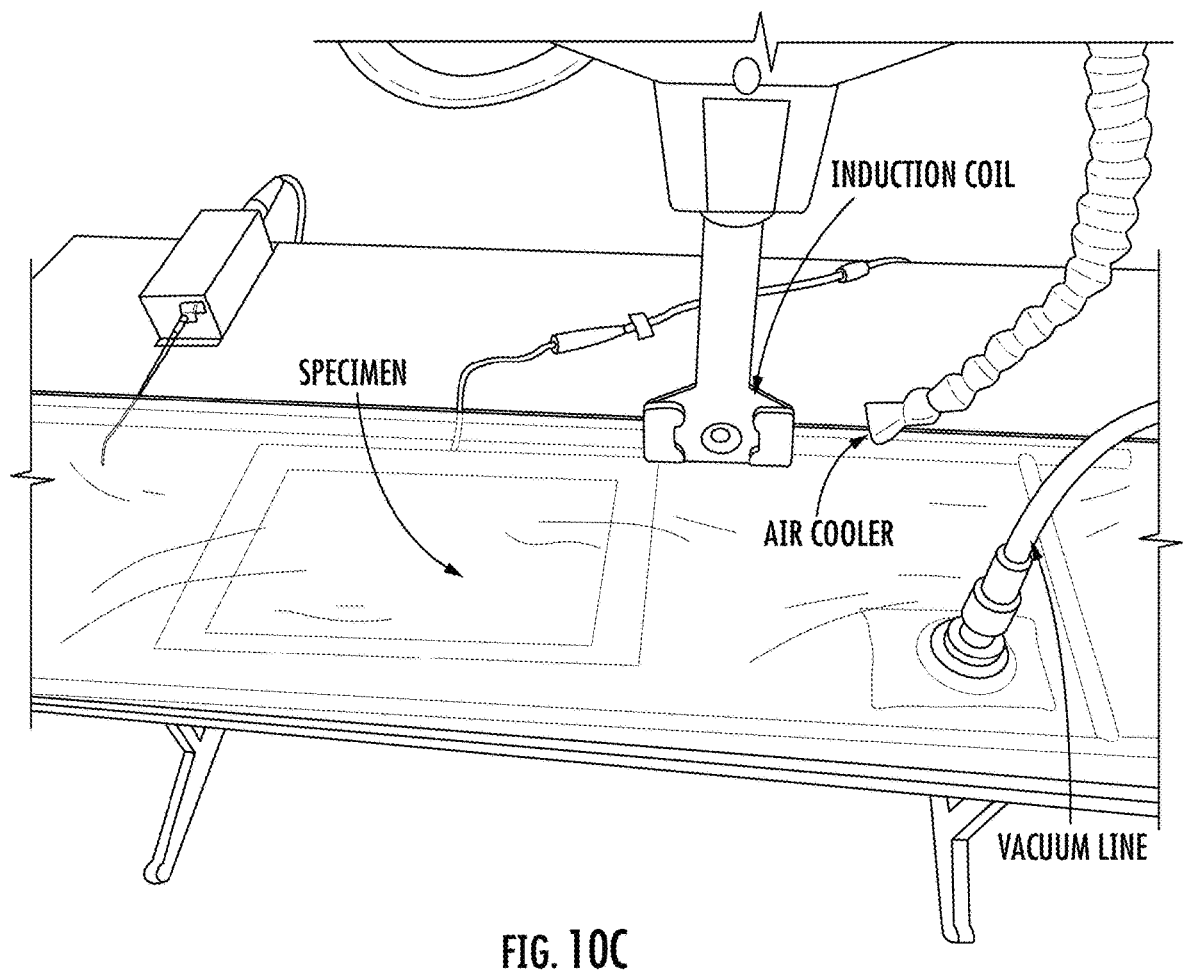

FIGS. 9 and 10A through 10C represent in-situ temperature monitoring arrangements for use in accordance with presently disclosed subject matter during thermoplastic composite welding, with FIG. 9 representing an overall data acquisition system view, and FIGS. 10A through 10C focused on the presently disclosed combination of optical fiber with an optical system.

FIGS. 9 and 10A through 10C show a representative optical system, such as available from Luna Innovations Inc. (Blacksburg, Va.), usable for in-situ temperature measurement during real time welding in the presently disclosed combination of subject matter. In other words, the presently disclosed sensor arrangement is shown connected to an associated optical data acquisition system.

In particular, FIG. 10A illustrates an integrated IR camera, and FIG. 10C represents relative placement of an induction coil, specimen, air cooler, and vacuum line. Further, such figures show an induction welding setup used for manufacturing the welded specimens using induction heating coil with a vacuum bag setup. Induction heating was applied at a point as represented in FIG. 7B. A FLIR camera (thermal imaging infrared cameras) was also used to monitor the heating process. A heatsink was placed under the specimen to cool the bottom surface. Active air cooling was used to cool the top surface, all as illustrated.

Figure 11:
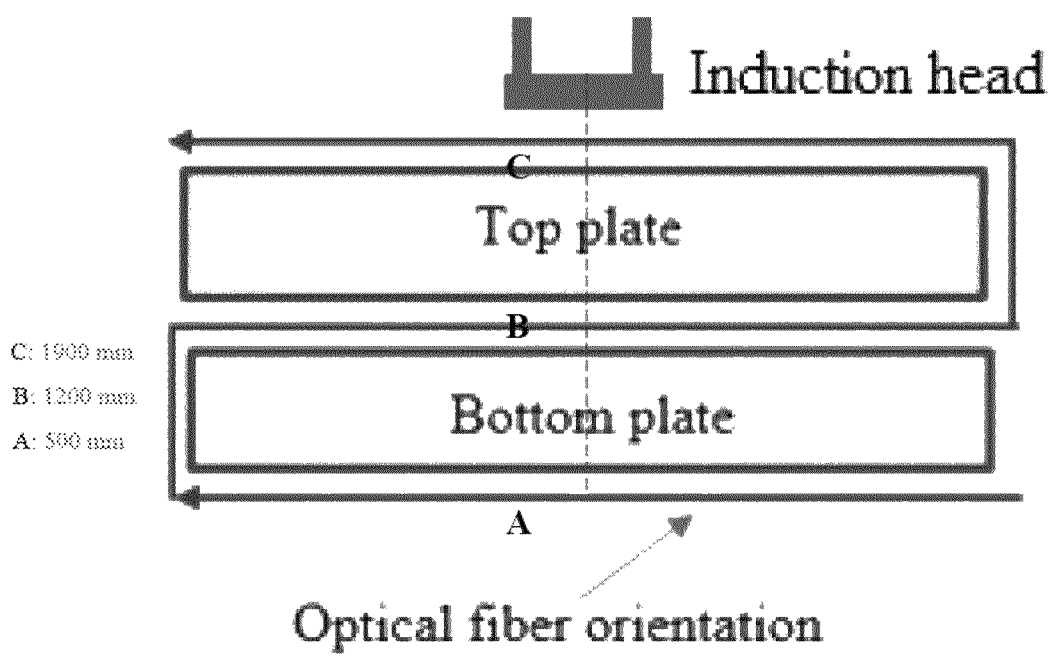
FIG. 11 is a schematic top view representation of an exemplary embodiment of presently disclosed subject matter, illustrating a distributed fiber optic sensor layout on a lap joint specimen.
Figure 12A:
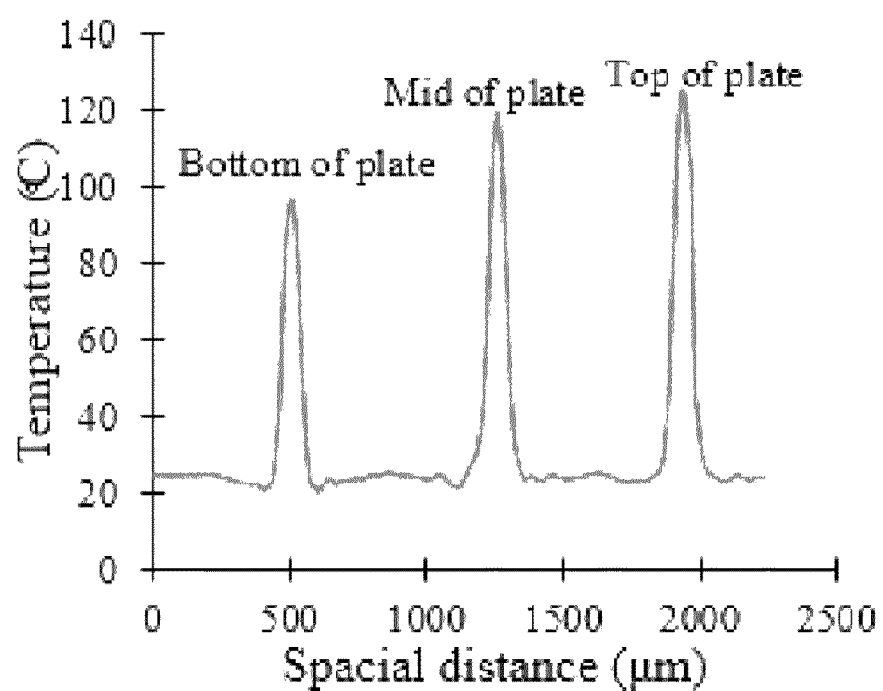
FIG. 12A graphically illustrates representative temperature distribution along an optical fiber length, as obtained in accordance with presently disclosed subject matter, such as in present FIG. 11.
Figure 12B:
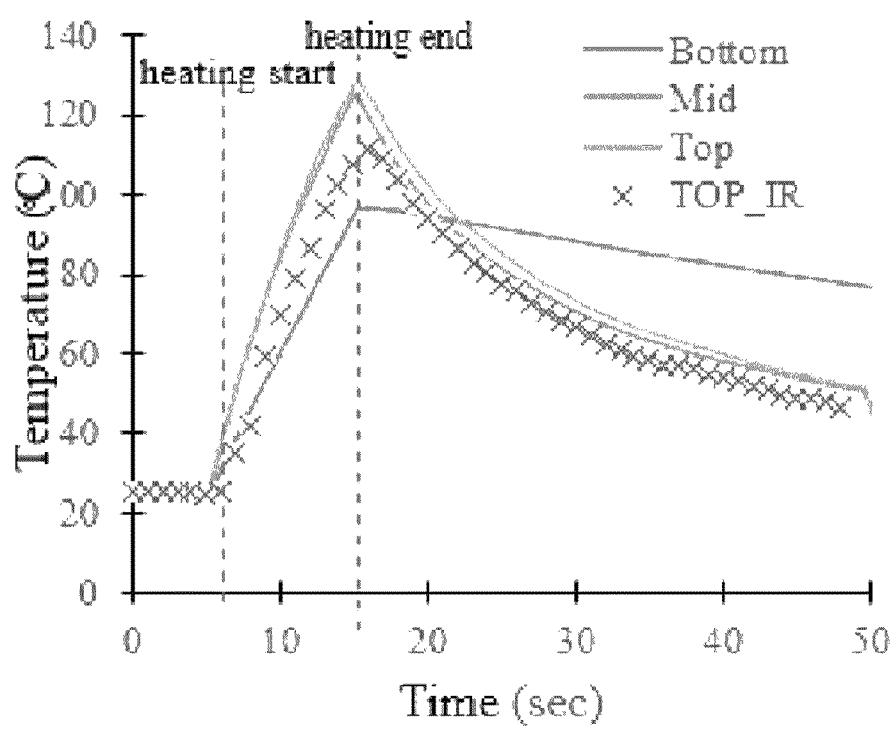
FIG. 12B graphically illustrates representative temperature distribution along an optical fiber length, as obtained in accordance with presently disclosed subject matter, such as in present FIG. 11, further illustrating such temperature distribution over time.

FIG. 11 is a schematic top view representation of an exemplary embodiment of presently disclosed subject matter, illustrating a distributed fiber optic sensor layout on a lap joint specimen, and with designated top, mid, and bottom locations A, B, and C. FIG. 12A graphically illustrates representative temperature distribution along an optical fiber length, as obtained in accordance with presently disclosed subject matter. FIG. 12B graphically illustrates representative temperature distribution along an optical fiber length, as obtained in accordance with presently disclosed subject matter, such as in present FIG. 12A, further illustrating such temperature distribution over time.

FIG. 12A shows the temperature distribution along the associated optical fiber length. Therefore, a first peak can be seen due to heating at the bottom surface of the plates. A second peak is associated with the mid plane (middle of the plate) while a third peak is associated with the top surface of the plate. While FIG. 12A shows the determined temperature distribution along the fiber length in accordance with presently disclosed subject matter, FIG. 12B specifically represents the resulting temperature distribution over time. As noted, temperature increases after heating starts, but then begins to decrease after heating ends. The graphical information represents charted temperatures at the three representative locations of "bottom," "mid" and "top." It also represents the temperature data as obtained over time using the infrared arrangement referenced above (whereby a thermal imaging infrared camera was also used to monitor the top surface heating process). In particular, the IR camera was also used to measure the temperature of the top surface as a reference. The results show that the temperatures acquired at the top plate and the middle plate are higher than that from the bottom plate.

Figure 13A:
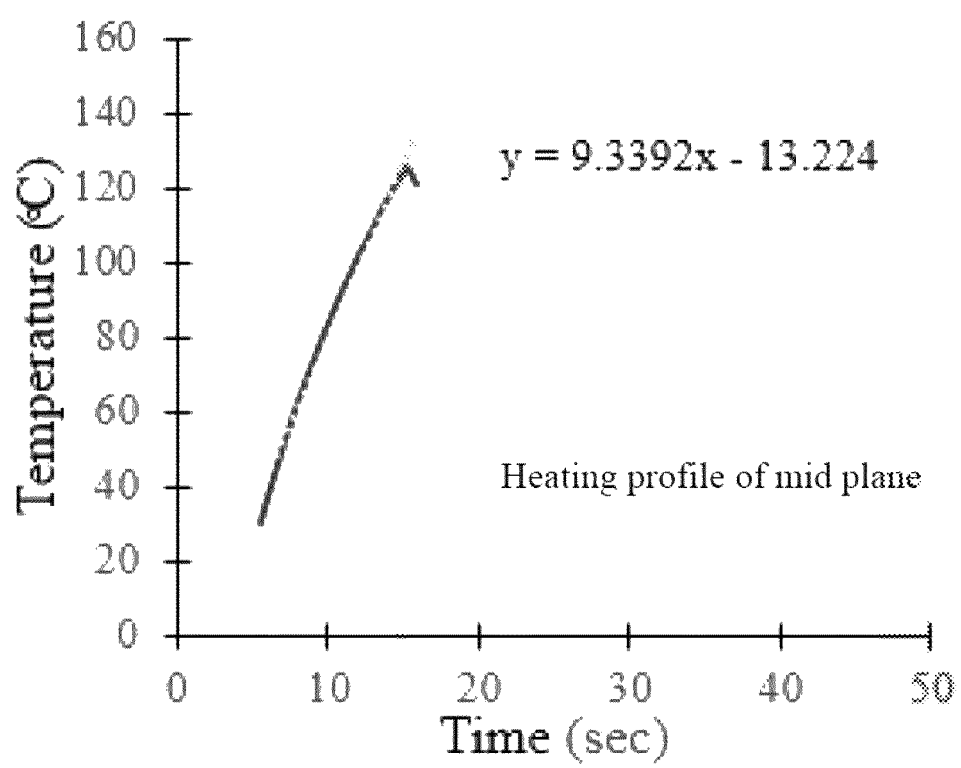
FIG. 13A graphically illustrates representative heating profile temperature distribution along a mid plane portion of an optical fiber length, as obtained in accordance with presently disclosed subject matter, such as in present FIG. 11, further illustrating such temperature distribution over time.
Figure 13B:
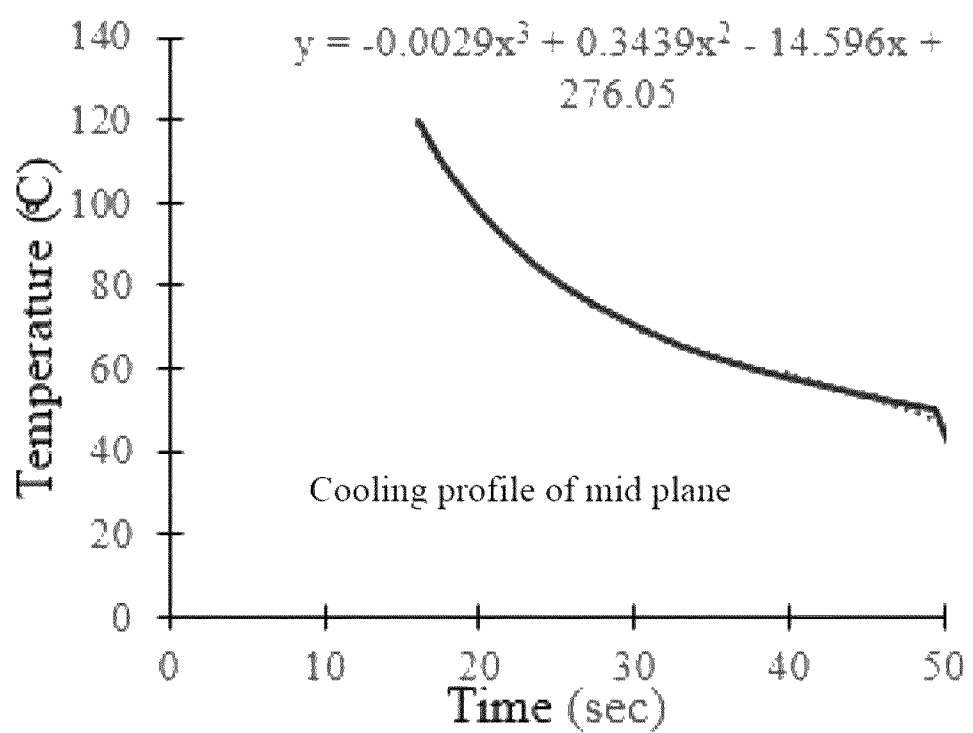
FIG. 13B graphically illustrates representative cooling profile temperature distribution along a mid plane portion of an optical fiber length, as obtained in accordance with presently disclosed subject matter, such as in present FIG. 11, further illustrating such temperature distribution over time.

Temperature distribution of the middle plane is the most important one for proper induction welding. Therefore, the heating profile and cooling profile of the mid plane during welding is also determined, as shown by FIGS. 13A and 13B. A focus on heating profile and cooling profile is important for induction welding of a lap joint. Accordingly, FIG. 13A graphically illustrates representative heating profile temperature distribution along a mid plane portion of an optical fiber length, as obtained in accordance with presently disclosed subject matter, such as in present FIG. 11, further illustrating such temperature distribution over time. FIG. 13B graphically illustrates representative cooling profile temperature distribution along a mid plane portion of an optical fiber length, as obtained in accordance with presently disclosed subject matter, such as in present FIG. 11, further illustrating such temperature distribution over time.

Figure 14:
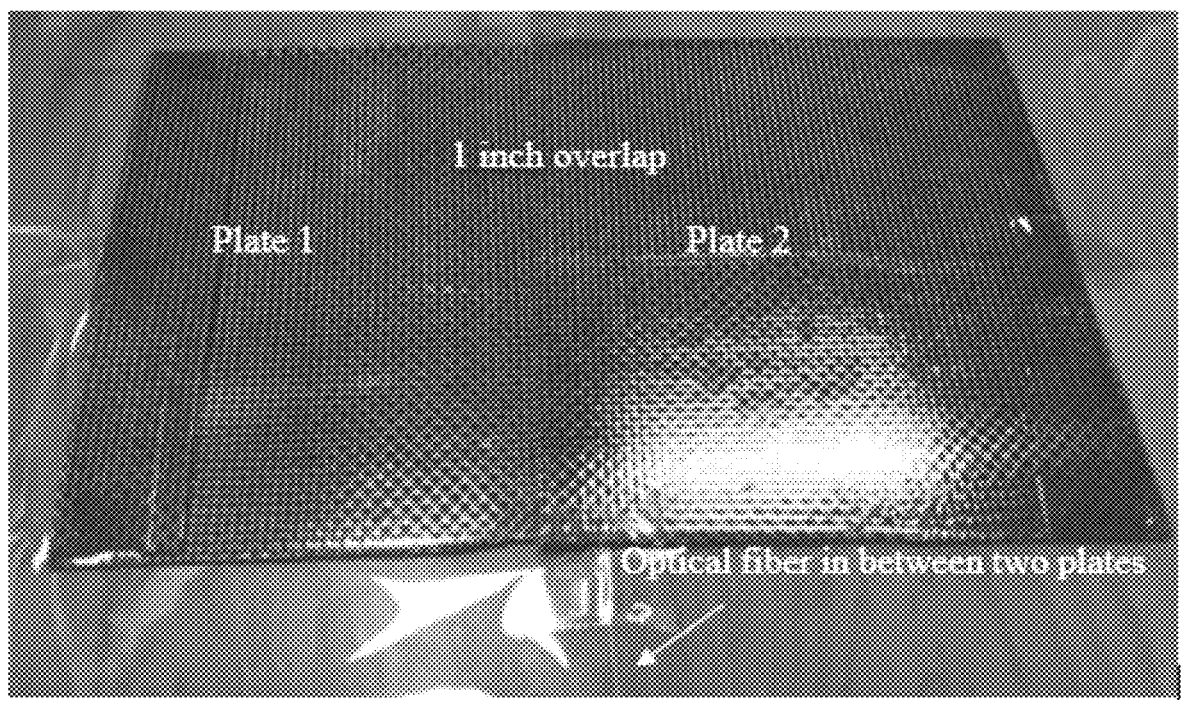
FIG. 14 is a representation of an exemplary embodiment of presently disclosed subject matter, illustrating a distributed fiber optic sensor layout on a lap joint specimen.

FIG. 14 is a representation of an exemplary embodiment of presently disclosed subject matter, illustrating a distributed fiber optic sensor layout on a lap joint specimen. In particular, an optical fiber resided between two plates, which have a respective one-inch overlap with each other.

Insofar as assessment of mechanical properties, the mechanical strength of welded lap joints with and without sensors was measured. Since the fiber optic sensor is an external inclusion, it may create stress concentration in the composite lap joint. The 12"×6" sample was cut in to 6"×6" samples, and then the samples were placed side by side with 1-inch overlap, as illustrated in FIG. 14. In other words, FIG. 14 reflects composite plates positioned for formation of a hot press lap joint.

Figure 15:
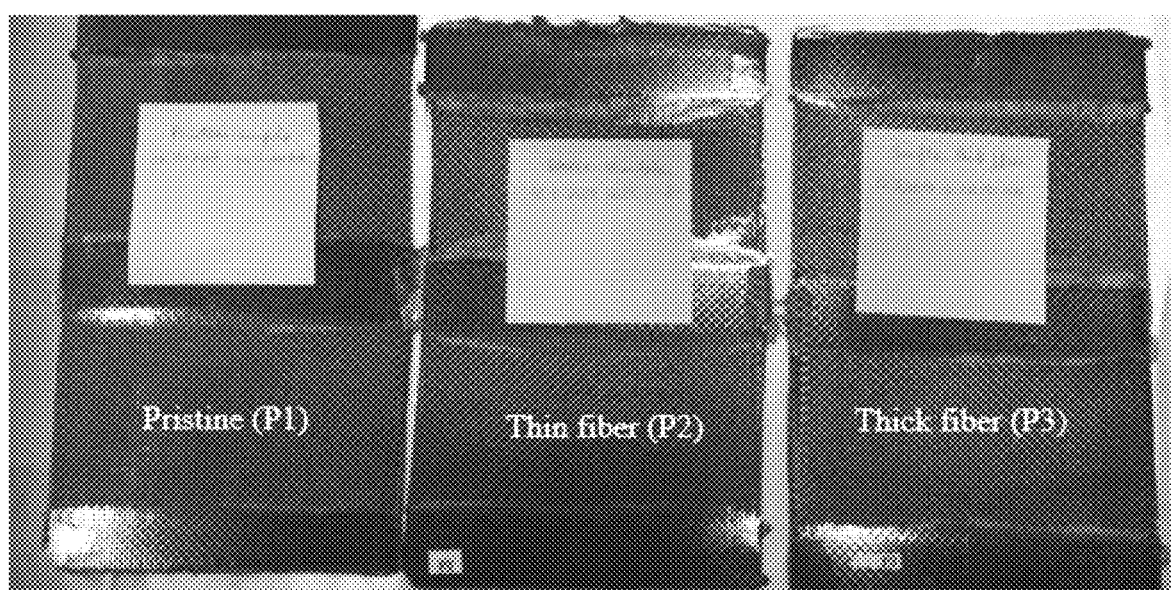
FIG. 15 is a representation of an exemplary embodiment of presently disclosed subject matter, illustrating final hot-pressed lap joint samples.

Three categories of samples were manufactured, including: (a) Pristine lap joint (without inclusion of fiber), (b) Inclusion of thin fiber, and (c) Inclusion of thick fiber. FIG. 15 is a representation of an exemplary embodiment of presently disclosed subject matter, illustrating final hot-pressed lap joint samples, and representing such three categories of samples.

The entire samples were placed in the hot press for bonded lap joint. FIG. 15 shows the final lap joint samples after compression molding. The samples were numbered as P1, P2 and P3, respectively.

In such samples, both of the samples with fibers are PEEK (polyetheretherketone; a thermoplastic material) coated. The thick optical fiber is SM polyimide radiation resistant fiber with core/cladding/polyimide coating/PEEK coating diameter at 9 µm/125 µm/155 µm/400 µm. The thin optical fiber is SM1500 with core/cladding/polyimide coating/PEEK coating diameter at 5.3 µm/80 µm/102 µm/228 µm. FIG. 16 is a chart representation of an exemplary embodiment of presently disclosed subject matter, including the referenced optical fibers noted above.

Figure 17:
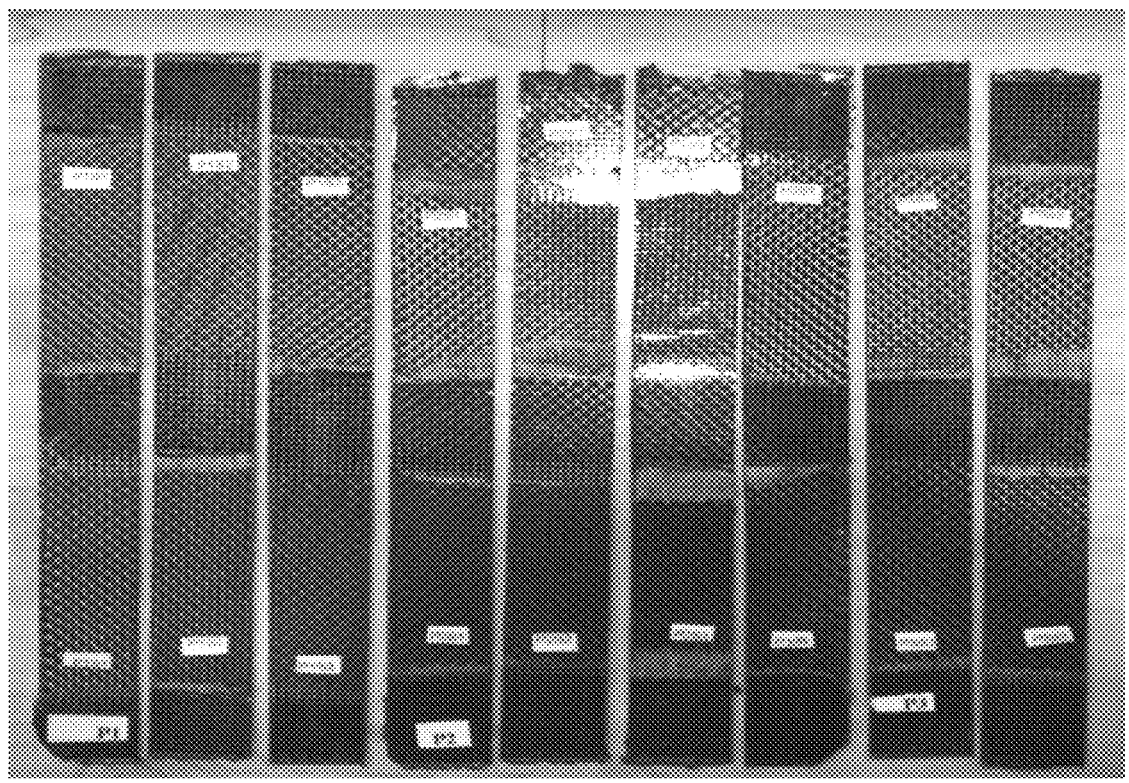
FIG. 17 is a representation of an exemplary embodiment of presently disclosed subject matter, illustrating a coupon sample for tensile testing.

FIG. 17 is a representation of an exemplary embodiment of presently disclosed subject matter, illustrating a coupon sample for tensile testing. Five 1"×8" coupons were prepared from each plate and only the middle three were tested as shown in FIG. 17. The nine samples as illustrated in FIG. 17 are designated as P1S1, P1S2 . . . P3S3. In order to compare the strength of the lap with pristine plates, the mechanical strength of three pristine plates were also determined.

Figure 18:
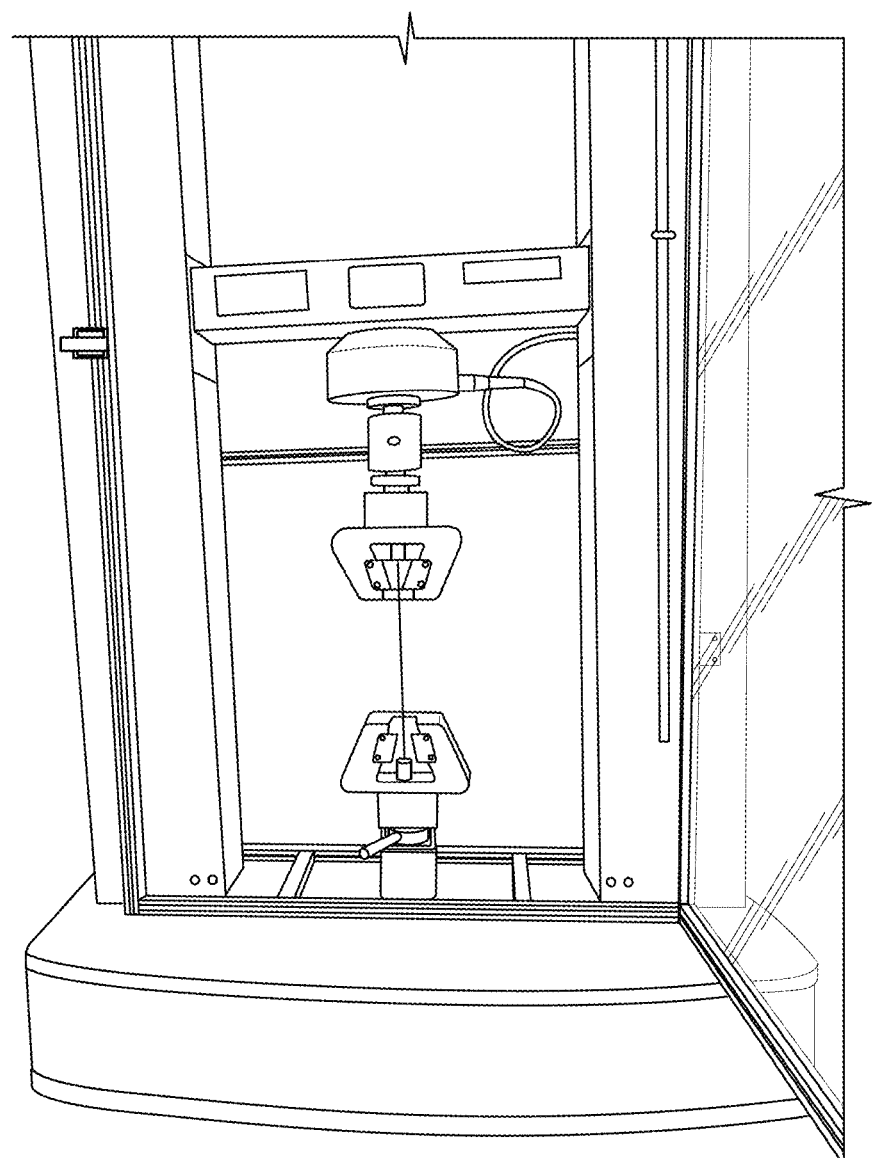
FIG. 18 is a representation of an exemplary embodiment of presently disclosed subject matter, illustrating a testing setup.

FIG. 18 is a representation of an exemplary embodiment of presently disclosed subject matter, illustrating a testing setup used in determining tensile strength of samples. In particular, the mechanical strength of the coupon samples was measured through a tensile test on a MTS tensile test system (FIG. 18). The test was configured to enable measurement of the ultimate breaking load for all the samples. The MTS test system enables the repeatability and the flexibility needed to perform a full spectrum of static material testing.

FIGS. 19A through 19E illustrate respective representations of exemplary embodiments of presently disclosed subject matter, sampled for testing. In particular, FIGS. 19A through 19C show, respectively, images of the break samples for pristine, thin fiber, and thick fiber samples, after the tensile test.

Figure 20:
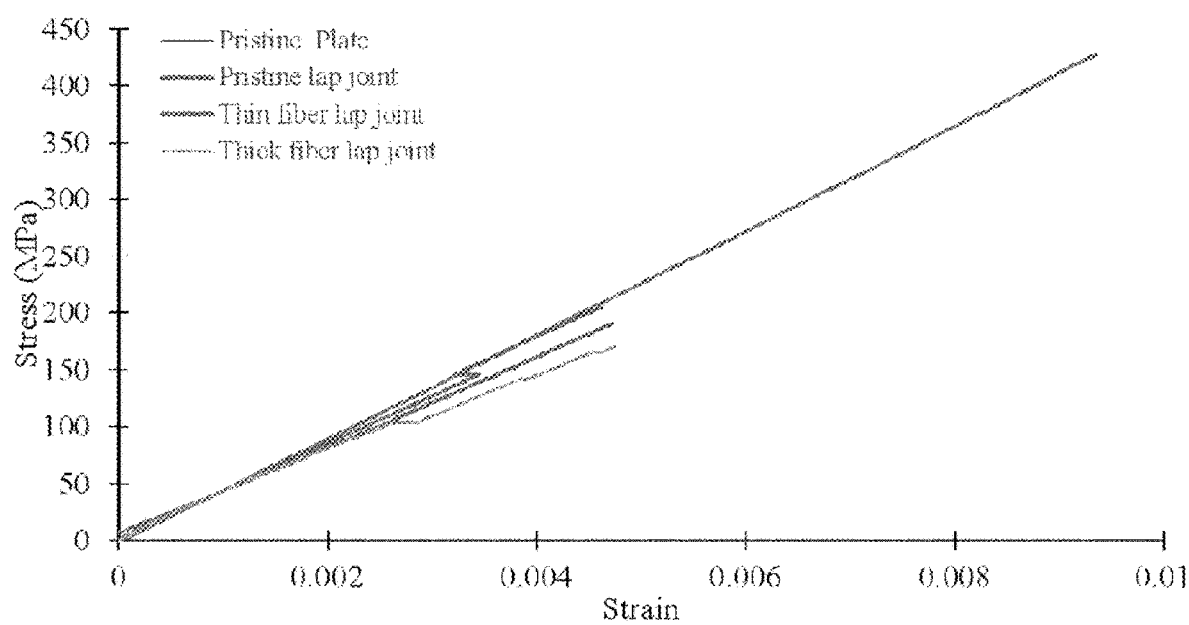
FIG. 20 is a graphical representation of stress strain diagrams for tested samples of exemplary embodiments of presently disclosed subject matter.

Test results showed that the strength of the lap joints of pristine, thin fiber and thin fiber lap joint are 48.7%, 48.32% and 47.1% of that of the pristine plate. More particularly, FIG. 20 shows the stress strain diagram of one sample from each group. The strength of the pristine plate is a lot higher than that of the lap joints because the pristine plate has different failure mode compared to the lap joint. The tensile strength of all the samples is shown in FIG. 21.

Figure 21:
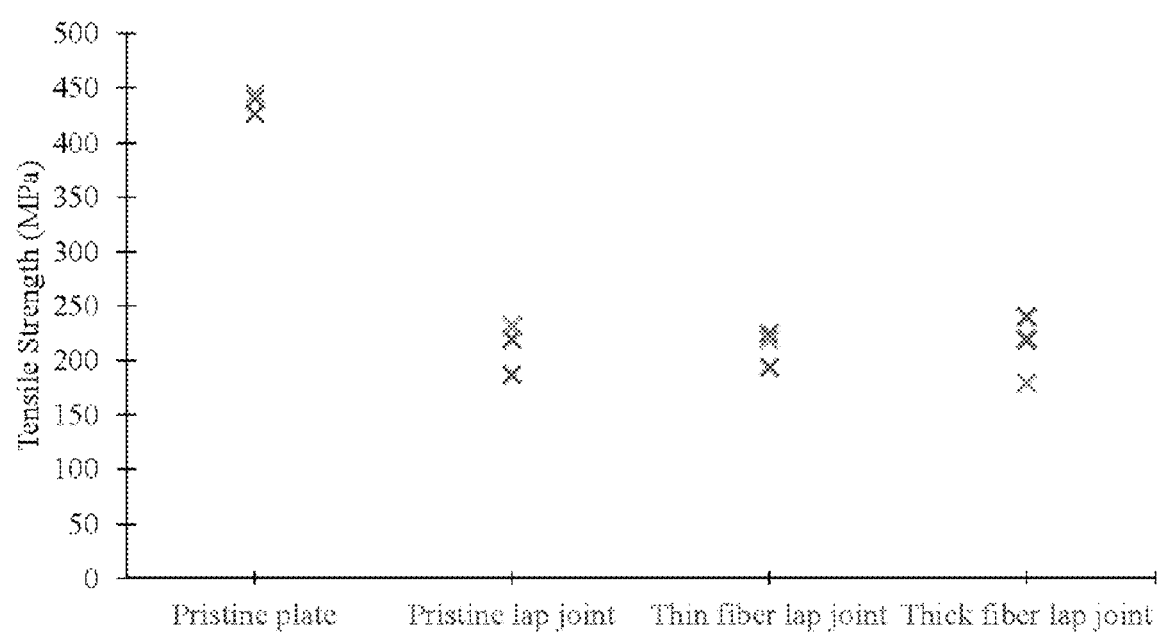
FIG. 21 is a graphical representation of tested samples of exemplary embodiments of presently disclosed subject matter.
Figure 22:
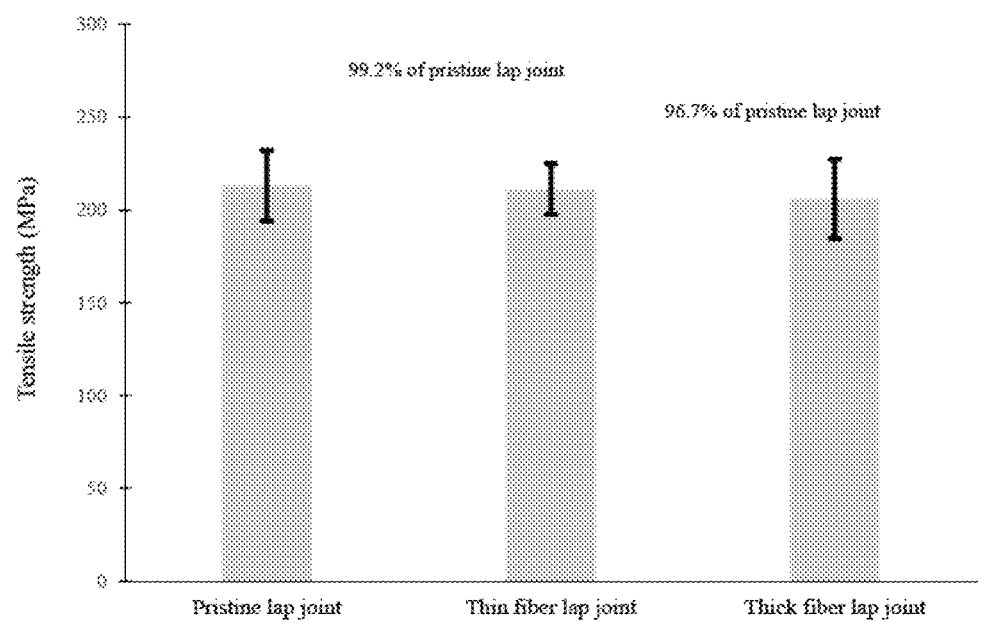
FIG. 22 is a graphical representation of tested samples of exemplary embodiments of presently disclosed subject matter.

Thus, FIG. 20 is a graphical representation of stress strain diagrams for tested samples of exemplary embodiments of presently disclosed subject matter; and FIG. 21 is a graphical representation of tested samples of exemplary embodiments of presently disclosed subject matter. FIG. 22 is a graphical representation of tested samples of exemplary embodiments of presently disclosed subject matter, showing mean strength with standard error of the samples, which in effect provides strength comparisons for different types of lap joints. We compared the strength of pristine lap joint and with fiber optic sensor. As shown, the thin fiber lap joint arrangement/embodiment has 99.2% of the strength of the pristine lap joint (no fiber optic sensor). The thick fiber is a little weaker and has 96.7% of the pristine strength. From these results (FIG. 22), the strength of the lap joints with embedded fiber optic sensor is seen to be close to the pristine plate. Therefore, it can be concluded that inclusion of fiber optic sensor does not change the mechanical strength significantly. Thus, the fiber optic sensor can be used as embedded sensor for temperature monitoring during welded lap joint, per presently disclosed subject matter.

Figure 23A:
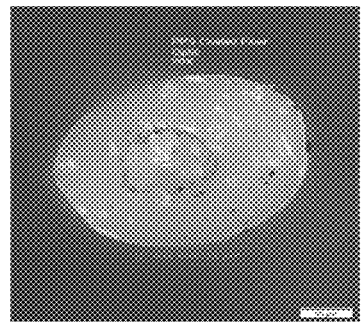
FIG. 23A is a representation of an exemplary embodiment of presently disclosed subject matter, illustrating an unpolished PPS coated optical filter embodiment.

The following further describes various observed data from presently disclosed embedding of PPS coated optical fibers in composite plates. For example, FIG. 23A is a representation of an exemplary embodiment of presently disclosed subject matter, illustrating an unpolished PPS coated optical filter embodiment. This, and other images, were obtained to review the melting of the fiber coating by first imaging the PPS coated optical fiber under a thermal optical microscope at 20× magnification. FIG. 23A is one such example. In this situation, the melting temperature of the PPS coating (as applied for obtaining remaining fibers imaged in FIGS. 23B and 23D) was about 295° C.

Figure 23B:
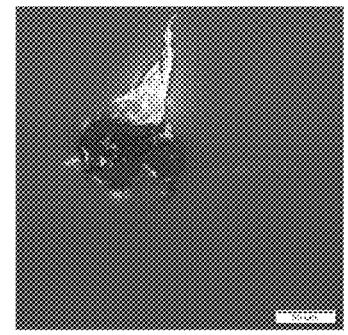
FIG. 23B is a representation of an exemplary embodiment of presently disclosed subject matter, illustrating an unpolished embodiment after melting heat has been applied.

FIG. 23B is a representation of an exemplary embodiment of presently disclosed subject matter, illustrating an unpolished embodiment after melting heat has been applied.

Figure 23C:
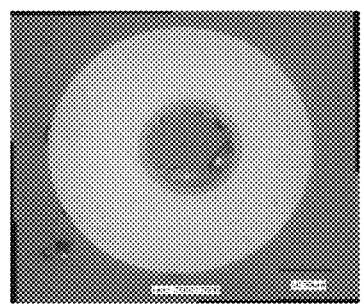
FIG. 23C is a representation of an exemplary embodiment of presently disclosed subject matter, illustrating a polished PPS coated optical filter embodiment.
Figure 23D:
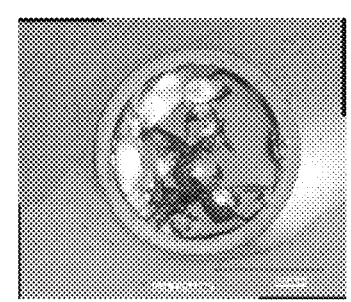
FIG. 23D is a representation of an exemplary embodiment of presently disclosed subject matter, illustrating a polished embodiment with polyimide only.

FIG. 23C is a representation of an exemplary embodiment of presently disclosed subject matter, illustrating a polished PPS coated optical filter embodiment. FIG. 23D is a representation of an exemplary embodiment of presently disclosed subject matter, illustrating a polished embodiment with polyimide only. FIG. 23C shows a cross-section of newly coated core and cladding. However, FIG. 23D shows the cross section of the new fiber after heating the fiber above the melting temperature of PPS. This was done on a microscope on a heated bed. As the image shows, the coating has disappeared while the cladding is still present. This is simply because in this instance, the cladding was not stripped prior to being recoated with the PPS.

In the context of using a hot press for creating a bonded lap joint, with embedded PPS coated optical fibers in composite plates, two potential procedures form part of presently disclosed subject matter. They include using hot press for bonded lap joint with inclusion of PPS optical fiber and using induction welding for bonded lap joint with inclusion of PPS optical fiber.

Figure 24:
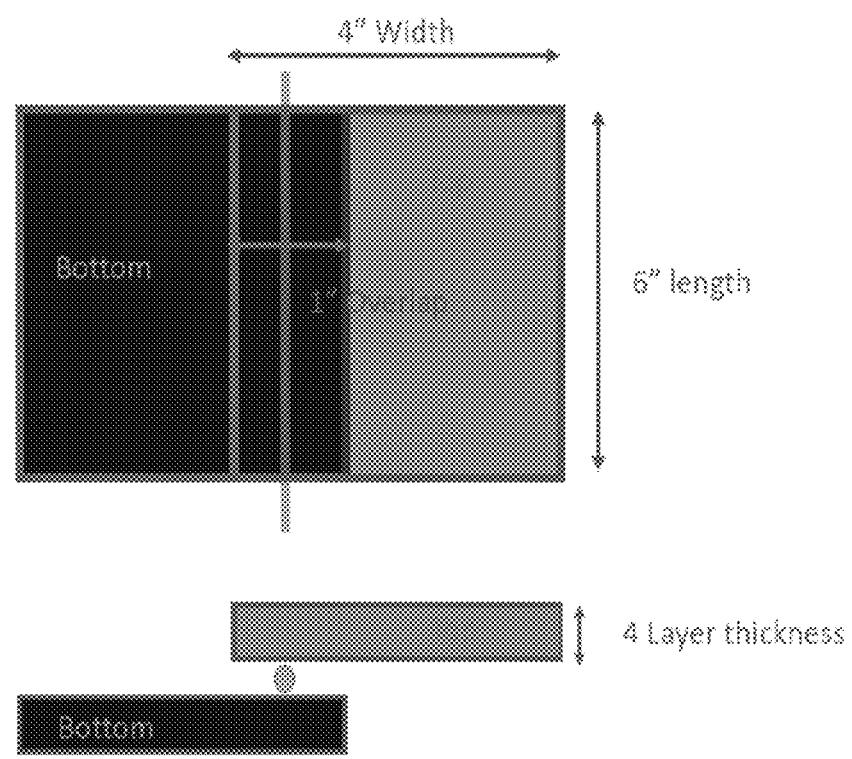
FIG. 24 is a schematic representation of an exemplary embodiment of composite plates with optical fiber of presently disclosed subject matter.

FIG. 24 is a schematic representation of an exemplary embodiment of composite plates with optical fiber of presently disclosed subject matter. In such FIG. 24, two 6"×4" sample panels are placed side by side with 1-inch overlap to create a bonded lap joint per a hot press. As shown, there is a four-layer thickness represented.

As otherwise discussed herein, presently disclosed subject matter includes assessment of resulting mechanical properties, for use of particular embodiments for particular applications. For example, FIG. 25 is an optical microscopy image of a representation of an exemplary embodiment of presently disclosed subject matter, illustrating a hot-pressed sample specimen.

Figure 25:
FIG. 25 is an optical microscopy image of a representation of an exemplary embodiment of presently disclosed subject matter, illustrating a hot-pressed sample specimen.

For the optical imaging of hot press bonded sample of present FIG. 25, the PPS coating was melted and merged with the surrounding composite materials and what was left was only the inside 96.80 μm diameter optical core plus cladding. It may also be observed, as shown, that there are consistent voids occurring around the optical fiber core.

Figure 26:
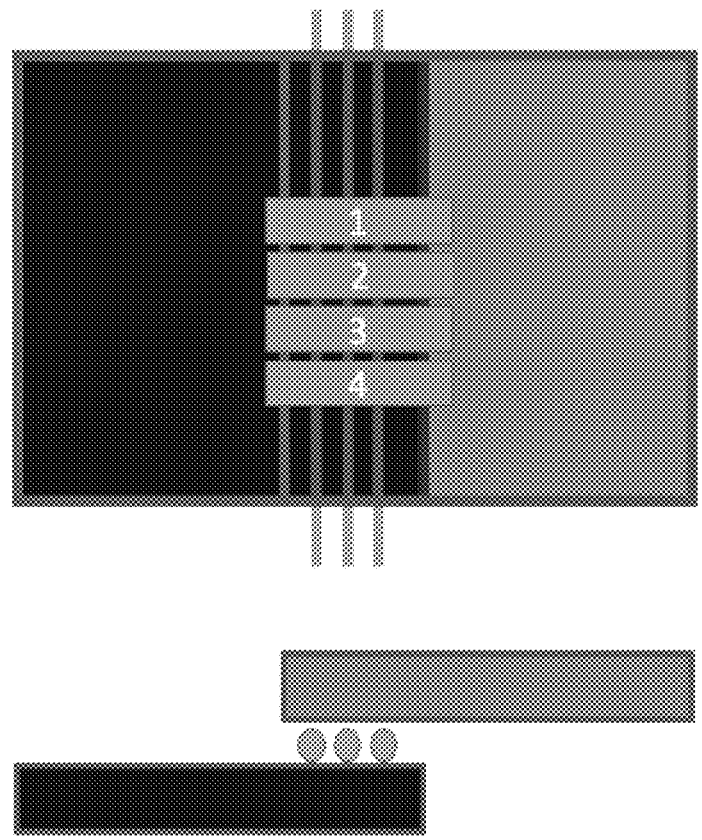
FIG. 26 is a schematic representation of an exemplary embodiment of presently disclosed subject matter, illustrating composite plates with optical fiber for induction welding lap joint specimens.

As otherwise referenced herein, presently disclosed subject matter may relate to using induction welding for bonded lap joint. FIG. 26 is a schematic representation of an exemplary embodiment of presently disclosed subject matter, illustrating composite plates with optical fiber for induction welding lap joint specimens.

In the embodiment of FIG. 26, vacuum bag induction welding is used for welding PPS coated optical fiber into the laminates. Constant speed at 2.5 mm/s was used for induction welding with a current setting of 320 amps and coil distance of ¼ inch from the top laminate surface.

Figure 27A:
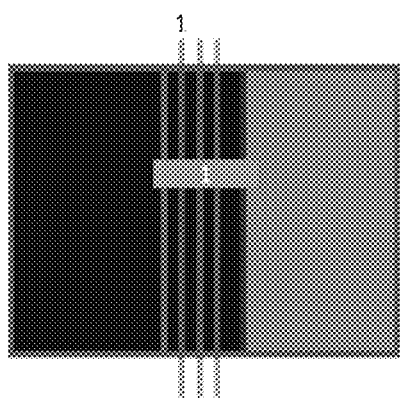
FIG. 27A is a schematic representation of an exemplary embodiment of presently disclosed subject matter, illustrating an induction welding lap joint specimen.
Figure 27B:
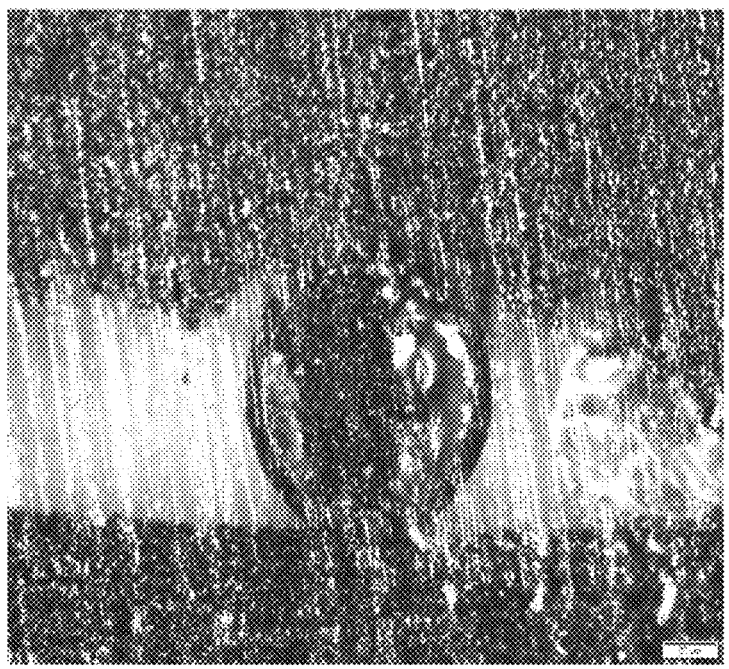
FIG. 27B is an optical microscopy image of a representation of an exemplary embodiment of presently disclosed subject matter, the subject matter of subject FIG. 27A.

As otherwise discussed herein, presently disclosed subject matter includes assessment of resulting mechanical properties, for use of particular embodiments for particular applications. For example, FIG. 27A is a schematic representation of an exemplary embodiment of presently disclosed subject matter, illustrating an induction welding lap joint specimen, while FIG. 27B is an optical microscopy image (cross-section) of a representation of an exemplary embodiment of presently disclosed subject matter, the subject matter of subject FIG. 27A. In considering the results from such optical imaging of induction welding bonded sample, it is noted that the PPS coating was observed to flow away from optical fiber as expected, and no voids were observed around optical fiber due to vacuum bagging used for pressure application during induction welding.

The presently disclosed subject matter shows that, for distributed optical fiber sensor for monitoring the temperature during welding process, optical fiber can be effective as a temperature sensor. Further, consideration of resulting mechanical properties (assessed on the basis of embedded optical fiber in lap joints) based on comparisons of three plates (pristine, thin fiber, and thick fiber), show that inclusion of optical fiber did not change the mechanical strength significantly. Further, the PPS coating was observed to be melted away during induction welding process. Thus, presently disclosed subject matter provides for quality control of induction welding of thermoplastic composites using temperature sensing with dissolvable coating equipped optical fibers.

Considered another way, presently disclosed subject matter has shown the ability to perform real time temperature monitoring of induction welding for thermoplastic composite lap joints using distributed fiber optic sensors. Mechanical testing on the lap joints with embedded fibers, show that the inclusion of fiber optic sensor does not reduce the samples' mechanical strength.

The presently disclosed subject matter can be used in a variety of potential industrial applications, including but not limited to monitoring temperature distribution during:
  thermoplastic composite welding;
  thermoset composite curing;
  composite compression molding; and
  freeze/thaw of large items involving public health interests.

It may also be used in yet other applications, for example, to examine residue strain after welding, to monitor temperature distribution during operation, or to monitor strain change during operation.

When used in the fabrication of welded thermoplastic composites through induction heating, the presently disclosed subject matter will increase efficiency and accuracy and reduce rejects because it can measure the temperature field distribution inside the material in the welded area. Such will advantageously lead to increase of productivity and minimize the risk of rejects. It will also simplify the thermoplastic induction welding process by overcoming the possibility of creating defects.

When used in the fabrication of autoclave or heated vacuum-bag or hot-press cured thermoset composites, the presently disclosed subject matter will increase efficiency and accuracy and reduce rejects because it can measure the temperature field distribution inside the material during the cure process and can develop temperature maps that can be used to adjust the heating pattern. Such will advantageously lead to increase of productivity and minimize the risk of rejects. It will also simplify the thermoset cure process by overcoming the possibility of creating defects.

When used in the case of refrigerated food items carried in bulk or other health-safety critical situation that required a uniformly maintained low or cryogenic temperature, the presently disclosed subject matter will promote safety by providing a continuous reading of low temperature distribution in the safety-critical item over a period of time.

A variety of entities may advantageously make use of the presently disclosed subject matter (both as to methodology and apparatus as presently disclosed) including, but not limited to, governmental and industrial laboratories, original equipment manufactures, and operators of large critical infrastructure projects (such as bridges and buildings), aerospace, energy generation, nuclear, oil, and automotive, and any related industries that are required or need to assure the safety of their products by structural health monitoring and nondestructive evaluations.

What is claimed is:

1. A sensor comprising, a fiber optic sensor comprising an optical fiber having an elongated body portion with a coating and fiber core for being a distributed sensor received in association with a specimen to be sensed, said fiber optic sensor further having a connection for being connected to an associated optical data acquisition system, whereby monitoring and diagnosis associated with such specimen may be conducted at plural locations of such associated specimen, and wherein the fiber optic sensor is embedded in the specimen comprising a thermoplastic composite welded structure, and said fiber optic sensor and associated optical data acquisition system monitors temperature distribution taken from plural locations in said specimen for in-situ fiber-optic direct temperature field measurement of said specimen, wherein said coating comprises an external coating of polyetheretherketone (PEEK) which can withstand heating to 610 degrees Fahrenheit;

said fiber core has a diameter of up to 9 μm;

said fiber optic sensor is permanently embedded in the thermoplastic composite welded structure; and said thermoplastic composite welded structure comprises two plates welded at a lap joint thereof, with said elongated distributed sensor wrapped around each respective plate and through a welding region between such two plates for simultaneous measurement of the temperature field inside the welding region and in the two plates for monitoring and inspection of the thermoplastic composite welded structure over its lifetime.

2. A sensor as in claim 1, wherein the specimen comprises a carbon fiber reinforced polymer (CFRP) composite with a composite matrix that is a thermoplastic polymer, and the specimen is to be treated by induction welding.

3. A sensor as in claim 1, wherein said fiber optic sensor includes a dissolvable coating.

4. A sensor as in claim 1, wherein said fiber optic sensor includes thermoplastic composite coatings to be embedded in the thermoplastic composite welded structure specimen during welding thereof.

5. A sensor as in claim 1, wherein said fiber optic sensor includes cladding and coating with the same polymer as in the associated specimen.

6. A sensor as in claim 1, further including an associated heatsink and active air cooling.

* * * * *